US 9,816,622 B2

(12) United States Patent
Chiba

(10) Patent No.: US 9,816,622 B2
(45) Date of Patent: Nov. 14, 2017

(54) CHECK VALVE AND PUMPING SYSTEM

(71) Applicant: ISHIZAKI CORPORATION, Tokyo (JP)

(72) Inventor: Kazunori Chiba, Tokyo (JP)

(73) Assignee: ISHIZAKI CORPORATION, Tokyo (JP)

( * ) Notice: Subject to any disclaimer, the term of this patent is extended or adjusted under 35 U.S.C. 154(b) by 47 days.

(21) Appl. No.: 14/400,245

(22) PCT Filed: May 28, 2013

(86) PCT No.: PCT/JP2013/064732
§ 371 (c)(1),
(2) Date: Nov. 10, 2014

(87) PCT Pub. No.: WO2013/180108
PCT Pub. Date: Dec. 5, 2013

(65) Prior Publication Data
US 2015/0122353 A1    May 7, 2015

(30) Foreign Application Priority Data

May 31, 2012  (JP) .................................. 2012-124090
Jan. 25, 2013  (JP) .................................. 2013-012498

(51) Int. Cl.
*F16K 1/36*       (2006.01)
*F16K 47/02*     (2006.01)
(Continued)

(52) U.S. Cl.
CPC ................ *F16K 1/36* (2013.01); *F04B 23/02* (2013.01); *F04B 39/10* (2013.01); *F16K 15/063* (2013.01);
(Continued)

(58) Field of Classification Search
CPC ................ F16K 1/36; F16K 1/42; F16J 15/00
(Continued)

(56) References Cited

U.S. PATENT DOCUMENTS 199,814 A * 1/1878 Fifield ..................... F16K 47/08
                                                                       251/118
704,557 A     7/1902 Michener
(Continued)

FOREIGN PATENT DOCUMENTS

CH        289790 A      3/1953
CN      2584981 Y     11/2003
(Continued)

OTHER PUBLICATIONS

International Search Report dated Jul. 9, 2013, issued in corresponding application No. PCT/JP2013/064732.
(Continued)

*Primary Examiner* — Mary McManmon
*Assistant Examiner* — Nicole Gardner
(74) *Attorney, Agent, or Firm* — Westerman, Hattori, Daniels & Adrian, LLP

(57) ABSTRACT

A check valve (100) has a valve seat (20), and a valve disc (30) which closes the valve seat (20) in an openable/closable manner by linear reciprocating oscillation in the direction approaching or departing away from the valve seat (20), the check valve (100) being configured, as a lift-type check valve, to allow therein the inflow direction (D1) of a fluid (F) flowing into the valve seat (20) and the passing direction (D2) of the fluid (F) passing through the valve disc (30) to cross each other, the valve disc (30) being provided with, on the inflow side (primary side) thereof, a deflection surface (40) on which the fluid (F) is deflected from the inflow direction (D1) to the passing direction (D2).

16 Claims, 14 Drawing Sheets

(51) Int. Cl.
*F16K 15/06* (2006.01)
*F16K 27/02* (2006.01)
*F04B 23/02* (2006.01)
*F04B 39/10* (2006.01)

(52) U.S. Cl.
CPC .............. *F16K 27/02* (2013.01); *F16K 47/02* (2013.01); *Y10T 137/7922* (2015.04); *Y10T 137/86019* (2015.04)

(58) Field of Classification Search
USPC .......... 137/565.37, 542, 236.1, 511–543.23; 251/118, 322, 323; 277/644; 220/801
See application file for complete search history.

(56) References Cited

U.S. PATENT DOCUMENTS

| | | | |
|---|---|---|---|
| 862,714 A | 8/1907 | Constantinov | |
| 1,679,898 A | 8/1928 | Gilbert | |
| 1,716,722 A | 6/1929 | Fausek et al. | |
| 2,278,595 A * | 4/1942 | Stelzer | F04D 9/02 417/72 |
| 2,521,201 A * | 9/1950 | Clark | F01P 11/0238 137/493 |
| 2,701,581 A | 2/1955 | Carlson et al. | |
| 2,725,076 A | 11/1955 | Hansen et al. | |
| 3,298,393 A | 1/1967 | Mosier | |
| 3,542,332 A * | 11/1970 | Chevalier | F16K 31/1221 251/367 |
| 3,613,723 A * | 10/1971 | Witt | C02F 1/686 137/238 |
| 3,911,950 A * | 10/1975 | Lowe | F16K 17/0466 137/543.17 |
| 3,970,280 A * | 7/1976 | Kunz | A23N 7/005 251/361 |
| 4,270,571 A * | 6/1981 | Pauliukonis | F16K 47/04 137/614.11 |
| 4,576,197 A * | 3/1986 | Kempers | B67D 7/68 137/1 |
| 4,648,534 A | 3/1987 | Esser | |
| 4,757,974 A * | 7/1988 | Ward | F16K 15/063 137/542 |
| 4,883,086 A * | 11/1989 | Lejnar | B01F 5/0496 137/399 |
| 5,797,421 A * | 8/1998 | Merrett | A62C 35/68 137/236.1 |
| 5,915,410 A | 6/1999 | Zajac | |
| 6,267,137 B1 | 7/2001 | Watanabe et al. | |
| 6,997,208 B2 * | 2/2006 | Mack | B01D 29/114 123/196 R |
| 7,806,135 B2 * | 10/2010 | Kaneko | F16K 31/1635 137/202 |
| 8,962,122 B2 | 2/2015 | Adachi et al. | |
| 2005/0062000 A1 | 3/2005 | Bartell, Jr. et al. | |
| 2005/0271518 A1 * | 12/2005 | Beyer | F04D 9/06 417/38 |
| 2010/0178459 A1 | 7/2010 | Adachi et al. | |
| 2011/0146814 A1 * | 6/2011 | Groves, II | F16K 3/265 137/528 |
| 2013/0199639 A1 | 8/2013 | Hartnett et al. | |
| 2015/0122353 A1 * | 5/2015 | Chiba | F16K 47/02 137/535 |

FOREIGN PATENT DOCUMENTS

| | | |
|---|---|---|
| CN | 2603881 Y | 2/2004 |
| CN | 101487537 A | 7/2009 |
| CN | 101672368 A | 3/2010 |
| CN | 101784633 A | 7/2010 |
| CN | 201546972 U | 8/2010 |
| EP | 2060835 A2 | 5/2009 |
| FR | 2368864 A7 | 5/1978 |
| FR | 2498722 A1 | 7/1982 |
| GB | 2085128 A | 4/1982 |
| GB | 2155155 A | 9/1985 |
| GB | 2344635 A | 6/2000 |
| JP | 57107488 A | 7/1982 |
| JP | 62-183179 U | 11/1987 |
| JP | 7-260020 A | 10/1995 |
| JP | 8-14425 A | 1/1996 |
| JP | 2002-213629 A | 7/2002 |
| JP | 2002-323157 A | 11/2002 |
| JP | 2003-148634 A | 5/2003 |

OTHER PUBLICATIONS

Chinese Office Action dated Nov. 4, 2015 issued in counterpart Chinese patent application No. 20138028546.1, with English translation. (15 pages).

Extended European Search Report dated Dec. 23, 2015 issued in counterpart European patent application No. 139796343.5. (9 pages).

ommunication Pursuant to Article 94(3) EPC dated Jul. 5, 2017, issued in EP13796343.5.

* cited by examiner

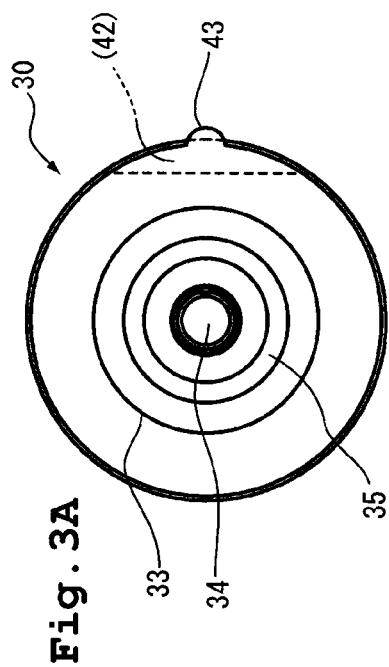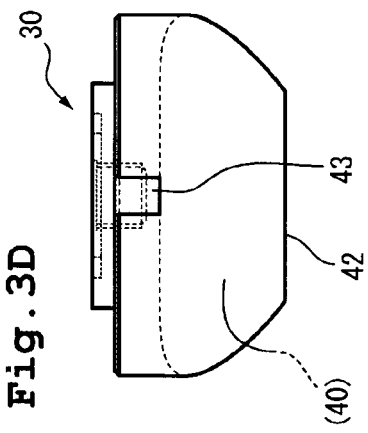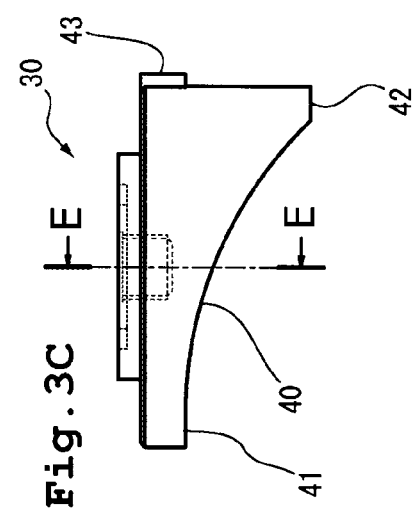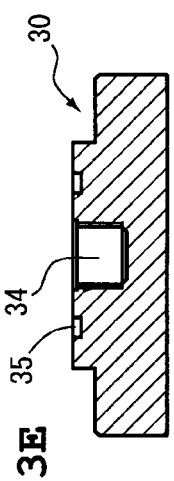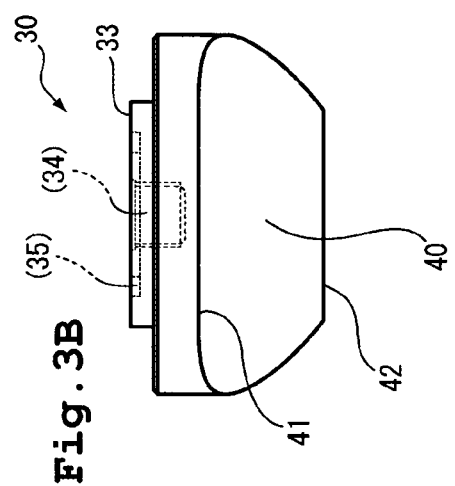

CHECK VALVE AND PUMPING SYSTEM

TECHNICAL FIELD

The present invention relates to a check valve which unidirectionally regulates a fluid flow, and a pumping system having the check valve.

BACKGROUND ART

There has been known check valves which allow fluid, such as water in a piping, to flow unidirectionally in a specific direction. The check valves are classified by operational modes of the valve discs into various types. It is difficult for swing-type and tilted-disc (butterfly) check valves, having the valve discs which open obliquely to the valve seats, to quickly close the valve discs, causing water hammer. On the other hand, the lift-type check valves including those of Smolensky type, are capable of swiftly closing the valve discs, since the valve discs oscillate in a linearly reciprocating manner in the direction they approach or depart from the valve seat, and thereby water hammer is avoidable in an effective manner.

Patent Literature 1 describes a straight lift-type check valve. This check valve is a straight valve in which the inflow direction towards the body and the outflow direction agree, so that the axial flow direction, given by connecting the inflow direction and the outflow direction, is straight. When pressure difference between the primary side and the secondary side of the valve disc exceeds a predetermined minimum working pressure (cracking pressure), the valve disc lifts up from the valve seat so as to allow the fluid to flow therethrough. The flow path of fluid, before and after the passage through the valve seat, is orthogonal to the axial flow direction, and is bent inside the body.

Patent Literature 2 describes a lift-type angle check valve. This check valve is an angle valve having the inflow direction towards the body orthogonal to the flowout direction, wherein the axial flow direction connecting the inflow direction and the flowout direction is bent inside the body. When pressure difference between the primary side and the secondary side of the valve disc exceeds the cracking pressure, the valve disc lifts up from the valve seat so as to allow the fluid to flow therethrough. The fluid which passed the valve seat collides on the valve disc to bend the flow path, and then discharged out from the body.

PATENT LITERATURE

[Patent Literature 1] JP-A-2003-148634
[Patent Literature 2] JP-A-H08-14425

SUMMARY OF THE INVENTION

Problem to be Solved

The check valves described in Patent Literatures 1 and 2, having the flow paths bent inside the bodies, however, suffer from large head loss, since the fluid is considerably slowed down when it passes through the valve discs.

The present invention is conceived in consideration of the problems described above, and is to provide a lift-type check valve with a small head loss.

Solution to Problem

According to the present invention, there is provided a lift-type check valve which includes a valve seat, and a valve disc which closes the valve seat in an openable/closable manner by linear reciprocating oscillation in the direction approaching or departing away from the valve seat, being configured to allow therein the inflow direction of a fluid flowing into the valve seat and the passing direction of the fluid passing through the valve disc to cross each other. The valve disc is provided with, on the inflow side thereof, a deflection surface on which the fluid is deflected from the inflow direction to the passing direction.

Now, the meaning of "the deflection surface deflects the fluid to the passing direction" means that the flow direction of the fluid after colliding against the deflection surface is directed more closer to the passing direction, as compared with the case where the fluid collides against the surface which is confronted to the inflow direction. According to the present invention, since the fluid is deflected on the deflection surface from the inflow direction into the valve seat towards the passing direction through the valve disc, so that the fluid is suppressed from being slowed down when it passes through the valve disc. Accordingly, even in the lift-type check valve, having the inflow direction into the valve seat and the passing direction through the valve disc intersecting each other, the fluid may be allowed to flow with a small head loss.

In the check valve of the present invention, the deflection surface may be a flat inclined surface, and the direction of normal line on the deflection surface may intersect at an angle smaller than 45° with the inflow direction.

The check valve may additionally have a water-tight, sheet-form sealing component which is held between the valve seat and the valve disc.

The sealing component may have a circumferential part which is held between the valve seat and the valve disc, and a stopper part which is provided inside the circumferential part so as to be contiguous therewith and increased in the thickness, to thereby configure the deflection surface, and the circumferential part and the stopper part may be molded from a single material in an integrated manner.

The stopper part may have a form of oblique cylinder which rises up from the circumferential part towards the oscillating direction of the valve disc, so as to allow, when the valve disc is closed, the sealing component to come into contact with the valve seat in a three-dimensional manner.

The sealing component may configure the deflection surface, and may be formed using a closed-cell foam resin material.

The deflection surface may be a curved surface which bulges in the direction the valve disc lifts up from the valve seat.

The deflection surface and the valve disc may be molded from a single material in an integrated manner.

The deflection surface may be a partial cylindrical surface formed around a cylinder axis which lies in a direction intersecting both of the inflow direction and the passing direction.

The radius of curvature of the partial cylindrical surface may be larger than the diameter of a flow path through which the fluid flows into the valve seat.

The check valve may additionally have a body which houses the valve seat and the valve disc, the body may have an inflow cylinder which configures a flow path on the primary side of the valve disc, and an outflow cylinder which configures a flow path on the secondary side of the valve disc, and the end face of the inflow cylinder in the body may incline corresponding to the deflection surface, to configure the valve seat.

The check valve may be configured as an angle valve having therein the inflow cylinder and the outflow cylinder arranged so as to intersect the axial directions each other.

The check valve may additionally have an elastic component which energizes the valve disc towards the valve seat, and a cap part which is detachable from the body, and supports the valve disc and the elastic component, and may be configured so that the valve disc and the elastic component are detachable from the body, by removing the cap part from the body.

The valve disc and the cap part may be rotatable to each other, and the elastic component may be pressurized against at least one of the valve disc and the cap part in a non-fixed manner.

At least one of the valve disc and the cap part may be provided with a resin material which frictionally holds the end of the elastic component.

The check valve may additionally have a guiding part which guides the valve disc to slide over the cap part in a non-rotatable manner.

According to the present invention, there is also provided a pumping system having the check valve described above. The pumping system includes a liquid reservoir which reserves a liquid; a pump which is installed overground and pumps up the liquid; a suction pipe which connects the liquid reservoir and the pump; and a discharge pipe which allows the liquid discharged from the pump to flow therethrough. The check valve is provided to the overground part of the suction pipe.

In this pumping system, since the check valve of the present invention is used as a foot valve for preventing leakage of water from the suction pipe, so that the liquid may be pumped up from the liquid reservoir only with a low pump pressure. Moreover, the check valve is readily maintainable since it is provided to the overground part of the suction pipe.

In the pumping system of the present invention, the suction pipe may have a suction part which is installed upright with the bottom end immersed in the liquid reservoir, and a transfer part which is laid on its side overground and is connected to the pump, and the check valve may be provided between the suction part and the transfer part.

The check valve may include a body which houses the valve seat and the valve disc, and a pressure reducing port which is formed to be opened in the body on the primary side of the valve disc. The pumping system may additionally have a vacuum pump connected to the pressure reducing port, and the pump may be an inverter pump.

Effects of Invention

According to the present invention, a lift-type check valve with a small head loss may be provided. According to the pumping system using the check valve as a foot valve, fluid may be pumped up with a small pump pressure.

BRIEF DESCRIPTION OF DRAWINGS

The above and other objects, features and advantages of the present invention will be more apparent from the following description of certain preferred embodiments taken in conjunction with the accompanying drawings.

FIG. 3A-3E a plan view illustrating a valve disc of the first embodiment. FIG. 3B is a left side elevation of the valve disc of the first embodiment. FIG. 3C is a front elevation of the valve disc of the first embodiment. FIG. 3D is a right side elevation of the valve disc of the first embodiment. FIG. 3E is a cross-sectional view taken along line E-E in FIG. 3C.

FIG. 5B is a longitudinal cross-sectional view illustrating an opened state of the check valve of the second embodiment.

FIG. 7B is a longitudinal cross-sectional view illustrating an opened state of the check valve of the third embodiment.

FIG. 8B is a longitudinal cross-sectional view illustrating an opened state of the check valve of the fourth embodiment.

FIG. 10B is an explanatory drawing illustrating a modified example of the resin sheet.

FIG. 12B is a schematic cross-sectional view illustrating a second example of the bottom end of the suction pipe.

DESCRIPTION OF EMBODIMENTS

Figure 1:
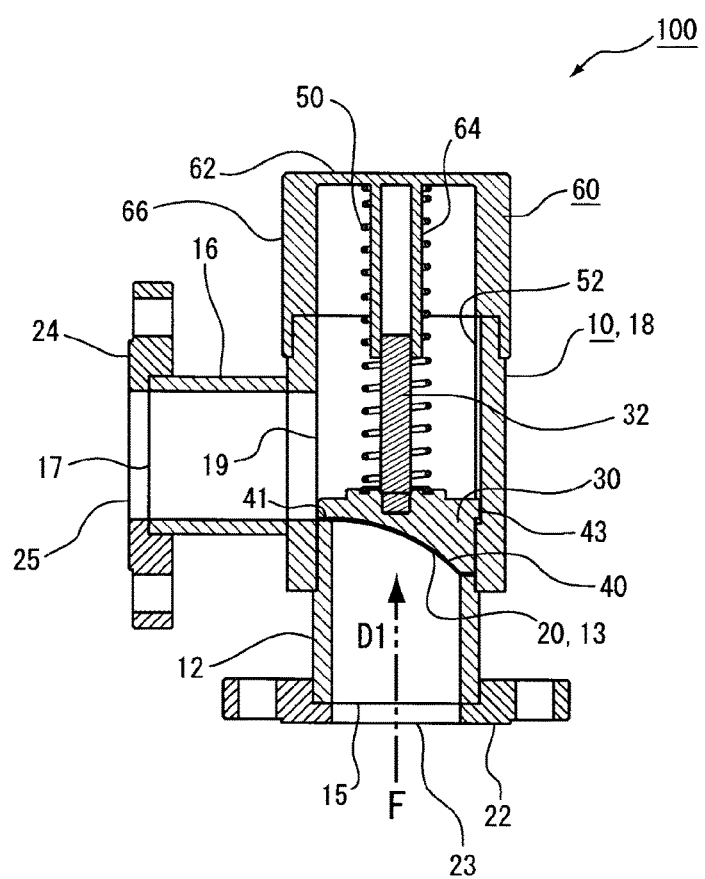
FIG. 1 is a longitudinal cross-sectional view illustrating a check valve according to a first embodiment of the present invention.

Embodiments of the present invention will be explained below referring to the attached drawings. In all drawings, all similar constituents will be given the same reference signs to avoid repetitive explanation. The inflow side of the check valve will be defined as the primary side, and the outflow side will be defined as the secondary side. While the valve disc is illustrated as opened upward in the drawings for the convenience sake, occasionally stating that the closing direction of the valve disc and the inflow direction of fluid as "downward", there is no intention of indicating the direction of gravity or the direction of installation of the check valve to the piping.

<First Embodiment>

Figure 2:
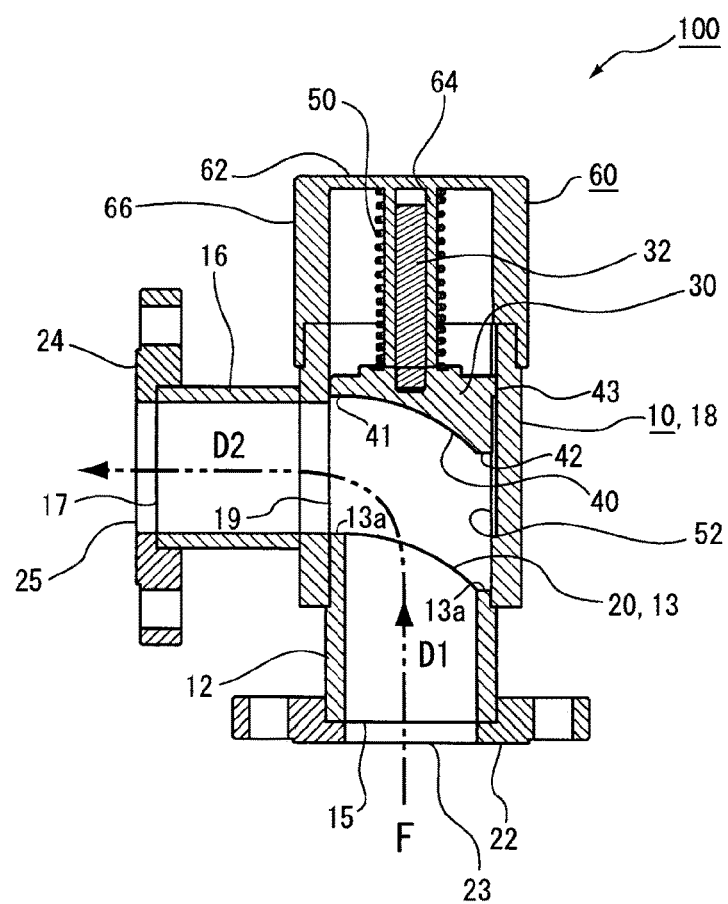
FIG. 2 is a longitudinal cross-sectional view illustrating an opened state of the check valve of the first embodiment.

FIG. 1 is a longitudinal cross-sectional view illustrating a check valve 100 according to a first embodiment of the present invention. FIG. 1 illustrates a closed state of a valve disc 30. FIG. 2 is a longitudinal cross-sectional view of the check valve 100 illustrating an opened state of the valve disc 30. FIG. 3A to FIG. 3E are explanatory drawings illustrating the valve disc 30.

First of all, the check valve 100 of this embodiment will be outlined. The check valve 100 includes a valve seat 20, and the valve disc 30 which closes the valve seat 20 in an openable/closable manner by linear reciprocating oscillation in the direction approaching or departing away from the valve seat 20. The check valve 100 is a lift-type check valve having therein the inflow direction D1 of a fluid F flowing into the valve seat 20 and the passing direction D2 of the fluid F passing through the valve disc 30 to cross each other. In the check valve 100 of this embodiment, the valve disc 30 is provided with, on the inflow side (primary side) thereof, a deflection surface 40 on which the fluid F is deflected from the inflow direction D1 to the passing direction D2. The upstream side of the fluid F straightened by the check valve 100 is referred to as the primary side of the check valve 100, and the downstream side is referred to as the secondary side.

Next, the check valve 100 of this embodiment will be detailed. The fluid F is a liquid such as water, or a gas such as the air. The check valve 100 of this embodiment is provided on a flow path through which the liquid or gas flows, and allows the fluid F to pass therethrough when pressure difference between the primary side and the secondary side of the valve disc 30 exceeds a predetermined minimum working pressure (cracking pressure). When the pressure difference between the primary side and the secondary side of the valve disc 30 becomes negative or below the minimum working pressure, the valve disc 30 closes to stop the flow of fluid F.

The check valve 100 additionally has a body 10 which houses the valve seat 20 and the valve disc 30. The body 10 has a valve cylinder 18, an inflow cylinder 12 which configures a flow path on the primary side of the valve disc 30, and an outflow cylinder 16 which configures a flow path on the secondary side of the valve disc 30. The end face 13 of the inflow cylinder 12 in the body inclines corresponding to the deflection surface 40. The end face 13 of the inflow cylinder 12 thus configures the valve seat 20.

The inflow cylinder 12 and the outflow cylinder 16 are straight cylinders with straight axial directions. The axial direction of the inflow cylinder 12 corresponds to the inflow direction D1, and the axial direction of the outflow cylinder 16 corresponds to the passing direction D2. The inflow cylinder 12 is provided with, at an end face 15 on the primary side thereof, a flange part 22 with a diameter larger than that of the inflow cylinder 12. The flange part 22 may be capped on the inflow cylinder 12 in a detachable manner. The flange part 22 may be fixed to the inflow cylinder 12 in a non-separable manner. As described later in a second embodiment, the flange part 22 and the inflow cylinder 12 may be molded from a single material in an integrated manner. The flange part 22 of this embodiment has a plurality of bolt holes pierced therein. The flange part 22 has, formed at the center thereof, an opening 23 having a diameter same as the inner diameter of the inflow cylinder 12. The opening 23 is an inlet port of the check valve 100.

The outflow cylinder 16 is provided, at the end face 17 thereof on the secondary side, with a flange part 24 having a diameter larger than that of the outflow cylinder 16. The flange part 24 may be capped on the outflow cylinder 16 in a detachable manner, or may be fixed thereto in a non-separable manner, or may be molded together with the outflow cylinder 16 from a single material in an integrated manner. The flange part 24 has a plurality of bolt holes pierced therein. The flange part 24 has, formed at the center thereof, an opening 25 having a diameter same as the inner diameter of the outflow cylinder 16. The opening 25 is an outlet port of the check valve 100. The flange parts 22, 24 serve as joining parts with which the check valve 100 is fixed to a piping (for example, suction pipe 210: see FIG. 4).

In the check valve 100 of this embodiment, the inflow direction D1 and the passing direction D2 cross at right angles. That is, the check valve 100 is an angle valve characterized by the axial directions of the inflow cylinder 12 and the outflow cylinder 16 cross each other. In this embodiment, the term "direction", as appears in "inflow direction D1 " and "passing direction D2 ", may occasionally be used to imply directed vector.

The check valve 100 has an elastic component 50 and a cap part 60. The elastic component 50 is a component which energizes the valve disc 30 against the valve seat 20. The elastic component 50 is specifically exemplified by a spiral spring. The cap part 60 is a component which is detachable from the body 10, and supports the valve disc 30 and the elastic component 50.

By taking the cap part 60 away from the body 10, the valve disc 30 and the elastic component 50 are detachable from the body 10. The cap part 60 screws around the valve cylinder 18 in the direction the inflow cylinder 12 extends (oscillation direction of the valve disc 30).

The valve cylinder 18 has a circular cylindrical form, with a side hole 19 bored in the circumferential surface. The outflow cylinder 16 is attached to the side hole 19 in a detachable manner, or fixed in a non-separable manner. The inflow cylinder 12 is internally fitted into one end of the valve cylinder 18 (bottom end in FIG. 1 and FIG. 2) in a detachable manner, or fixed in a non-separable manner. The top end face 13 of the inflow cylinder 12 is inserted into the valve cylinder 18.

The cap part 60 has a top plate 62, a straight cylinder 64 provided so as to rise up nearly at the center of the top plate 62, and a circumferential surface 66 rising up from the circumference of the top plate 62. The cap part 60 is externally fitted to the other end of the valve cylinder 18 (top end in FIG. 1 and FIG. 2) in a detachable manner. The elastic component 50 is attached on the outer circumference of the straight cylinder 64. In the straight cylinder 64, a guide shaft 32 is inserted in a slidable manner.

The guide shaft 32 is provided upright on the secondary side (upper side in FIG. 1 and FIG. 2) of the valve disc 30, in a detachable manner. More specifically, guide shaft 32 is externally threaded in the bottom end thereof, and screwed into a blind hole 34 of the valve disc 30 described later. In association with sliding of the guide shaft 32 relative to the straight cylinder 64, the valve disc 30 reciprocatingly oscillates so as to linearly approach and depart from the valve seat 20. The inflow cylinder 12 and the outflow cylinder 16 communicate when the valve disc 30 lifts up from the valve seat 20. The fluid F is thus allowed to pass through the check valve 100.

The valve cylinder 18 has, on the inner circumferential surface thereof, a keyway 52 formed so as to extend in the sliding direction of the guide shaft 32. The keyway 52 is engaged with a protrusion 43, which is a part of the valve disc 30, to guide the reciprocating oscillation of the valve disc 30.

In other words, the check valve 100 of this embodiment has a guiding part which guides the valve disc 30 to slide relative to the cap part 60 in a non-rotatable manner. In this embodiment, the protrusion 43 and the keyway 52 correspond to the guiding part.

The elastic component 50 slightly pressurizes the valve disc 30 against the valve seat 20, when the disc 30 and the valve seat 20 are brought into contact in the closed state. In other words, in the closed state of the valve disc 30, the elastic component 50 is slightly compressed from its natural length. When the valve disc 30 lifts away from the valve seat 20, the elastic component 50 is further compressed, and this increase the energizing force by which the valve disc 30 is pressurized against the valve seat 20. Ignoring now the gravitational acceleration exerted on the check valve 100, the valve disc 30 lifts up from the valve seat 20, up to a point where the energizing force of the elastic component 50 exerted onto the valve disc 30 balances with the total pressure of the fluid F (water stream pressure) (see FIG. 2).

The deflection surface 40 smoothly deflects the inflow direction D1 of the fluid F which passes through the valve seat 20, to the passing direction D2 through the valve disc 30. In this embodiment, the passing direction D2 through the valve disc 30 means the direction of the fluid F, input to the valve cylinder 18, passes through the side hole 19, that is, nearly the direction of normal line of the side hole 19.

The deflection surface 40 is a flat surface or curved surface which inclines in a direction given by a vector sum of the directed inflow direction D1 and the passing direction D2. The geometry of the deflection surface 40 may be a flat surface, a two-dimensional curved surface given by bending a flat surface around a single axis, or a three-dimensional curved surface given by bending a flat surface around a plurality of axes, without special limitation.

The deflection surface 40 of this embodiment is a curved surface which bulges in the direction the valve disc 30 lifts up from the valve seat 20. More specifically, the deflection surface 40 of this embodiment is a partial cylindrical surface (two-dimensional curved surface) formed around a cylinder axis which lies in a direction intersecting both of the inflow direction D1 and the passing direction D2 (lateral direction in FIG. 3B). The cylinder herein includes oblong circular cylinder and oval cylinder.

The radius of curvature of the partial cylindrical surface of the deflection surface 40 is larger than the radius of flow path of the fluid F flowing into the valve seat 20. Accordingly, the fluid F is prevented from being sharply deflected in an excessive manner, and thereby the lifting force of fluid F which lifts up the valve disc 30 is prevented from being excessively reduced. The cracking pressure of the check valve 100 is therefore prevented from excessively increasing. The radius of flow path of the fluid F flowing into the valve seat 20 herein means the inner dimension (radius) of the inflow cylinder 12, and the aperture radius of the valve seat 20 projected in the inflow direction D1. The radius of curvature of the partial cylindrical surface of the deflection surface 40 in this embodiment is larger than the diameter of flow path of the fluid F flowing into the valve seat 20. By virtue of this configuration, of the force exerted by the fluid F so as to pressurize the deflection surface 40, a component in the direction along the guide shaft 32 (oscillation direction of the valve disc 30) surpasses a component in the direction orthogonal to the guide shaft 32 (lateral force). Accordingly, during the reciprocating oscillation of the valve disc 30, the guide shaft 32 smoothly slides relative to the straight cylinder 64. The geometry and dimension of the deflection surface 40 of this embodiment projected in the inflow direction D1 are equal to the aperture geometry and dimension of a cross-section which appears when the inflow cylinder 12 is cut at right angles to the inflow direction D1. While the radius of curvature of the deflection surface 40 of this embodiment is uniform overall, as substitute for this embodiment, the radius of curvature of the deflection surface 40 may be locally varied. In the closed state of the valve disc 30 (see FIG. 1), the whole part of the deflection surface 40 falls in the aperture of the inflow cylinder 12.

The valve disc 30 has a nearly disc-like geometry. The deflection surface 40 and the valve disc 30 are molded from a single material in an integrated manner. In the paragraphs below, the side of the valve disc 30 where the deflection surface 40 is formed will be referred to as the bottom face, and the opposite side as the top face. The valve disc 30 has, formed on the top face thereof a thickened reinforcement 33. The reinforcement 33 has a blind hole 34 provided at the center thereof. The blind hole 34 has a spiral groove (not illustrated) on the circumferential surface thereof, with which the externally threaded part at the bottom end of the guide shaft 32 is screwed. The reinforcement 33 has an annular groove 35 formed in a portion around the blind hole 34. The annular groove 35 is fitted with the bottom end of the elastic component 50.

For convenience sake, the lateral direction in FIG. 3B will now be referred to as the widthwise direction. The left side of FIG. 3C will be referred to as the front, and the right side as the rear. On the front side in the direction of inclination of the deflection surface 40 (the lateral direction in FIG. 3C), a front-end flat part 41 is formed smoothly contiguous to the deflection surface 40. On the rear side of the deflection surface 40, a rear-end flat part 42 is formed as bent from the deflection surface 40. Direction of the normal lines on the front-end flat part 41 and the rear-end flat part 42 agree with the depth-wise direction of the blind hole 34, or oscillation direction of the valve disc 30. The maximum dimension in the width-wise direction of the front-end flat part 41 is smaller than that of the deflection surface 40, and larger than that of the rear-end flat part 42. The deflection surface 40 therefore has a swallow-tailed form such that the widthwise dimension of the deflection surface 40 gradually reduces towards the rear-end flat part 42. On the circumferential surface of the valve disc 30, and on the rear side of the rear-end flat part 42, a protrusion 43 is formed. The protrusion 43 of this embodiment has a semicylindrical form, and extends in the oscillating direction of the valve disc 30. The protrusion 43 fits into the keyway 52 of the valve cylinder 18 in a slidable manner. In the closed state of the valve disc 30, the front-end flat part 41 and the rear-end flat part 42 come into contact with a flat part 13a of the end face 13 of the inflow cylinder 12 in a fluid-tight manner (see FIG. 1, FIG. 2). A water-stopping seal such as O-ring may arbitrarily be inserted between the valve disc 30 and the valve seat 20. By providing the seal, the liquid-tightness between the valve disc 30 and the valve seat 20 in the closed state is improved. Position of insertion of the seal is not specifically limited. An annular seal may be attached so as to surround the end face 13 of the inflow cylinder 12, or an annular seal may be attached so as to surround all of the front-end flat part 41, the deflection surface 40 and the rear-end flat part 42. Alternatively, since the end face 13 of the inflow cylinder 12 and the deflection surface 40 are curved surfaces, the valve disc 30 may be brought into direct contact with the valve seat 20 in the closed state, without using the seal. Since the direction of normal lines on the front-end flat part 41 and the rear-end flat part 42 agree with the inflow direction D1, these portions are brought into contact with the flat part of the end face 13 of the inflow cylinder 12 straightly along the inflow direction D1 (that is, direction of water drainage). Accordingly, the valve disc 30 of this embodiment is excellent in water cut-off performance in the closed state without using a seal, despite having the curved deflection surface 40.

Referring now to FIG. 1, when the valve disc 30 is closed, the fluid F input to the inflow cylinder 12 through the end face 15 on the primary side thereof applies normal reaction onto the deflection surface 40. A component of the normal reaction, laid in the direction in which the guide shaft 32 extends, compresses the elastic component 50 to push up the valve disc 30 from the valve seat 20. The fluid F flows along the deflection surface 40, and stagnates at around the front-end flat part 41, or at around the side hole 19. When the valve disc 30 opens, the fluid F immediately runs out from the side hole 19. In the opened state of the valve disc 30 illustrated in FIG. 2, the fluid F which flows in the inflow direction D1 collides on the deflection surface 40, and is deflected along the deflection surface 40 into the passing direction D2, while retaining the opened state of the valve disc 30.

When the valve disc 30 elevates above the valve seat 20 under restriction and reaches the maximum height of elevation, the check valve 100 comes to the state of maximum opening. In the check valve 100 of this embodiment, the elevation of the valve disc 30 is restricted by the contact of the top face of the reinforcement 33 of the elevating valve disc 30 with the bottom end of the straight cylinder 64. In another possible configuration, the elevation of the valve disc 30 may be restricted when the guide shaft 32 reaches the deepest part in the straight cylinder 64, or the top plate 62. In the state of maximum opening of the check valve 100, the bottom end of the guide shaft 32 and the valve disc 30 reside inside the valve cylinder 18. The valve cylinder 18 is cylindrical, and the inner diameter of which agrees with the outer diameter of the valve disc 30. The valve disc 30 reciprocatingly oscillates inside the valve cylinder 18 while keeping the fluid-tightness. Over the whole stroke of the valve disc 30 from the closed state in contact with the valve seat 20 to the state of maximum opening, the valve disc 30 is kept housed inside the valve cylinder 18. Accordingly, the fluid F input in the inflow direction D1 is discharged through the side hole 19 and the outflow cylinder 16 out from the check valve 100, without sneaking behind the valve disc 30, or into the cap part 60. By avoiding the sneaking of the fluid D into the cap part 60, the valve disc 30 will not be inhibited from elevating.

When the valve disc 30 elevates, the air inside the cap part 60 is compressed. The top plate 62 or the circumferential surface 66 of the cap part 60 may have formed therein a vent hole through which the compressed air is vented. Accordingly, the valve disc 30 may be lifted up only with a weak force, and thereby the pressure loss of the check valve 100 may be reduced. On the other hand, by providing no vent hole to the cap part 60 as in this embodiment, the valve disc 30 may be phased quickly from the opened state to the closed state making use of elastic restoring force of the compressed air. Since the valve disc 30 thus quickly closes when the fluid F stops, the fluid F on the secondary side of the check valve 100 is successfully prevented from flowing backward. By using the check valve 100 as a so-called foot valve on the primary side of a lifting pump, leakage of water is successfully avoidable based on the backflow preventing function. As an alternative to the above, the check valve may be configured so that the fluid F input in the inflow direction D1 is guided behind the valve disc 30, that is, inside the cap part 60. More specifically, a slight gap is provided between the valve disc 30 and the surrounding valve cylinder 18, so as to allow the fluid L, in the opened state illustrated in FIG. 2, to flow inside the cap part 60, and then to enter the outflow cylinder 16. In this way, the inside of the cap part 60 may be kept clean by the flowing fluid L, so that any foreign matter caught in the elastic component 50 may be washed out immediately.

Figure 4:
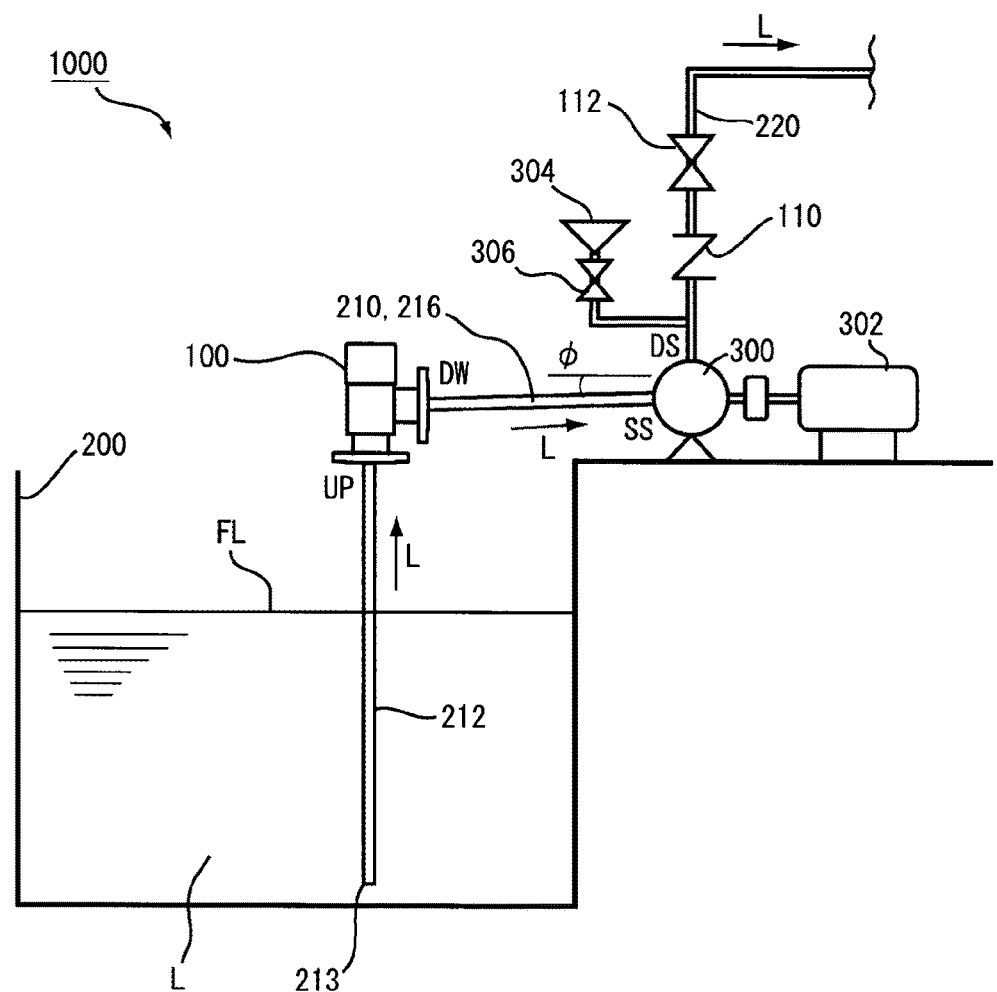
FIG. 4 is a configuration chart illustrating a pumping system of the first embodiment.

FIG. 4 is a configuration drawing of a pumping system 1000 which employs the check valve 100 as a foot valve. The pumping system 1000 is applicable in various ways, including water supply through water and sewer services, water supply for firefighting and ballast, and supply of cooling water. The fluid L to be pumped up is water, or any other liquids selectable depending on applications.

The pumping system 1000 of this embodiment has a liquid reservoir 200 which reserves a liquid L, a pump 300 which is installed overground and pumps up the liquid, a suction pipe 210 which connects the liquid reservoir 200 and the pump 300, and a discharge pipe 220 which allows the liquid L discharged from the pump 300 to flow therethrough. The check valve 100 is provided to the overground part of the suction pipe 210.

The pump 300 is connected with a drive unit 302 such as motor. The pump 300 is a ground pump, and may be either of self-priming type and non-self-priming type. This embodiment exemplifies a non-self-priming centrifugal pump. A priming tank 304 is installed higher than the pump 300. Priming water is supplied to the pump 300 by opening an on-off valve 306.

The suction pipe 210 includes a suction part 212 which is installed upright with the bottom end 213 immersed in the liquid reservoir 200, and a transfer part 216 which is laid on its side overground and is connected to the pump 300. The check valve 100 is provided between the suction part 212 and the transfer part 216. The bottom end 213 of the suction pipe 210 is positioned below the liquid level FL of the liquid L.

The transfer part 216 is disposed between the secondary side of the check valve 100 and the suction side SS of the pump 300. The transfer part 216 upwardly slopes towards the pump 300 at an incline of $\phi$. The check valve 100 opens the flow path by the discharge pressure of the pump 300, and allows the liquid L to pass unidirectionally from the suction part 212 (primary side UP) to the transfer part 216 (secondary side DW). A discharge pipe 220, which is connected to the discharge side DS of the pump 300, is provided with a second check valve 110 which allows the liquid L, discharged from the pump 300, to flow unidirectionally in the discharge direction (upward direction in FIG. 4). Further on the secondary side of the second check valve 110, an on-off valve 112 is disposed.

When pump 300 stops the operation, the flow path of the transfer part 216 is closed, and the pressure of the transfer part 216 increases. The pressure difference between the primary side UP and the secondary side DW of the check valve 100 then falls below the minimum working pressure (cracking pressure), and thereby the valve disc 30 quickly closes. In this way, the liquid L in the transfer part 216 remains inside the transfer part 216, without causing leakage from the check valve 100 which serves as a foot valve. Accordingly, also the liquid L inside the suction part 212 remains therein without being drained. By virtue of this configuration, the pump 300 may be restarted without feeding the priming water from the priming tank 304 to the suction part 212 and the transfer part 216, or only with a minimum amount of supply.

In the pumping system 1000 of this embodiment, the check valve 100 is installed overground, and is therefore excellent in workability regarding installation and maintenance. In particular, the check valve 100 of this embodiment is attached to the top end of the valve cylinder 18 in a detachable manner, and is further better in the maintainability. When any foreign matter is caught between the valve disc 30 and the valve cylinder 18, or when the slidability between the guide shaft 32 and the straight cylinder 64 degrades, or when the elasticity of the elastic component 50 degrades, the pump 300 is stopped, and the cap part 60 is detached from the valve cylinder 18. In this way, the elastic component 50, the guide shaft 32 and the valve disc 30 may be detached with ease from the valve cylinder 18. In short, according to the check valve 100 of this embodiment, the valve disc 30, which is a moving part of the check valve 100, may be detached with ease for maintenance, without detaching the suction pipe 210 (suction part 212, transfer part 216) and the body 10.

While the embodiment above exemplified the pumping system 1000 which allows a liquid (water) to pass therethrough, the present invention is not limited thereto. The check valve 100 may be installed on a gas flow path such as air duct (vent pipe), so as to utilize it as a check damper for backflow prevention which allows gas (air) to unidirectionally pass therethrough.

<Second Embodiment>

Figure 5A:
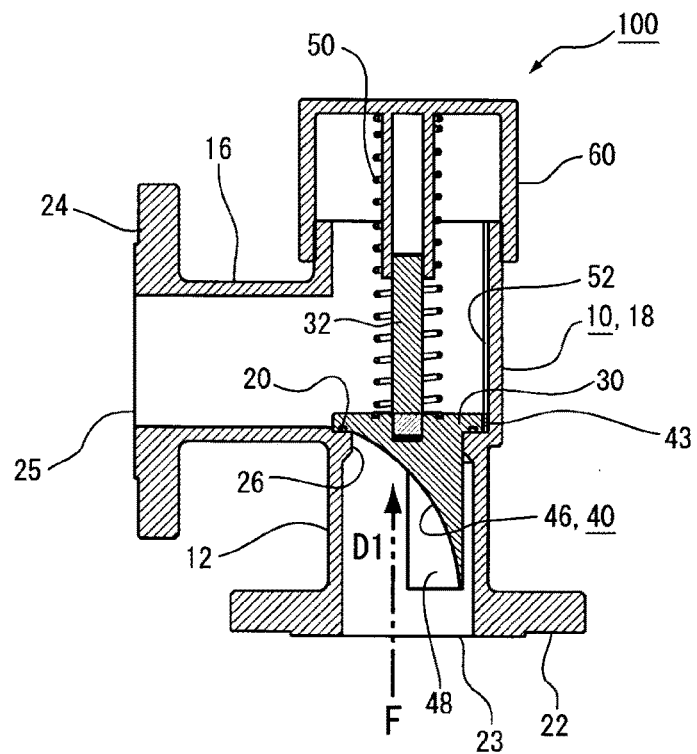
FIG. 5A-5B is a longitudinal cross-sectional view illustrating a closed state of the check valve of a second embodiment.
Figure 5B:
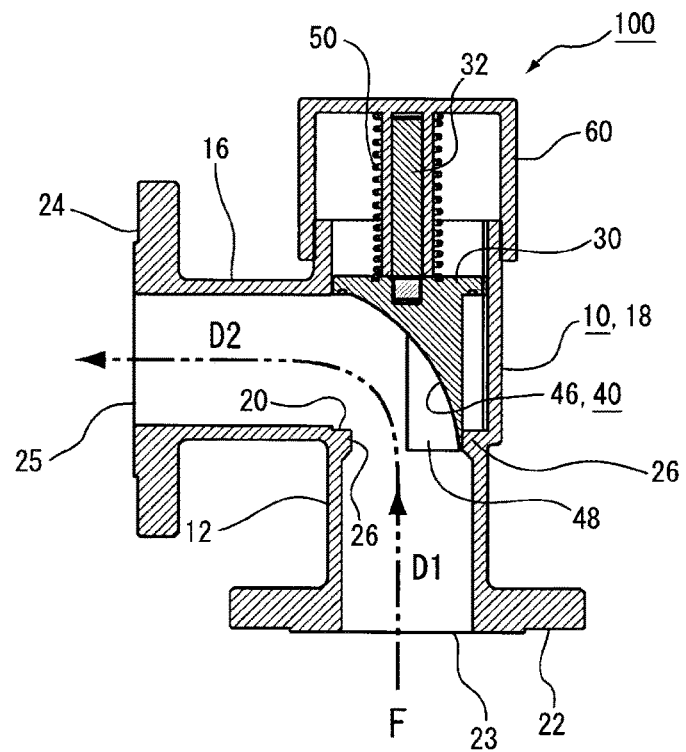

FIG. 5A, FIG. 5B is a longitudinal cross-sectional view illustrating the check valve 100 of a second embodiment. FIG. 5A illustrates the closed state of the valve disc 30, and FIG. 5B illustrates the opened state of the valve disc 30.

The check valve 100 of this embodiment is same as the first embodiment in the aspect below. That is, the check valve 100 is an angle valve characterized by the axial directions of the inflow cylinder 12 and the outflow cylinder 16 cross each other. Behind (on the secondary side of) the valve disc 30 which linearly oscillates in a reciprocating manner relative to the valve seat 20, the elastic component 50 and the guide shaft 32 are attached, so as to elastically pressurize the valve disc 30 against the valve seat 20. The cap part 60 screws towards the valve cylinder 18 in the oscillation direction of the valve disc 30, and is detachable from the valve cylinder 18.

The deflection surface 40 of this embodiment is different from the first embodiment, in that it is a composite surface of a first partial cylindrical surface 46 formed around a cylinder axis which intersects both of the inflow direction D1 and the passing direction D2, and a second partial cylindrical surface 48 formed around a cylinder axis which agrees with the inflow direction D1.

The body 10 includes the valve cylinder 18, the inflow cylinder 12, the outflow cylinder 16, and the flange parts 22, 24. The valve cylinder 18, the inflow cylinder 12 and the outflow cylinder 16 of this embodiment are integrated with each other. Methods of manufacturing the valve cylinder 18, the inflow cylinder 12 and the outflow cylinder 16 are not specifically limited, allowing that they may be cast in an integrated manner, or they may be molded separately and then coupled together using coupling components such as T-joints. The flange parts 22, 24 are similarly integrated with the valve cylinder 18. At the boundary between the inflow cylinder 12 and the valve cylinder 18, an inner flange 26 is formed. The end face of the inner flange 26, faced to the valve cylinder 18, configures the valve seat 20.

Figure 6:
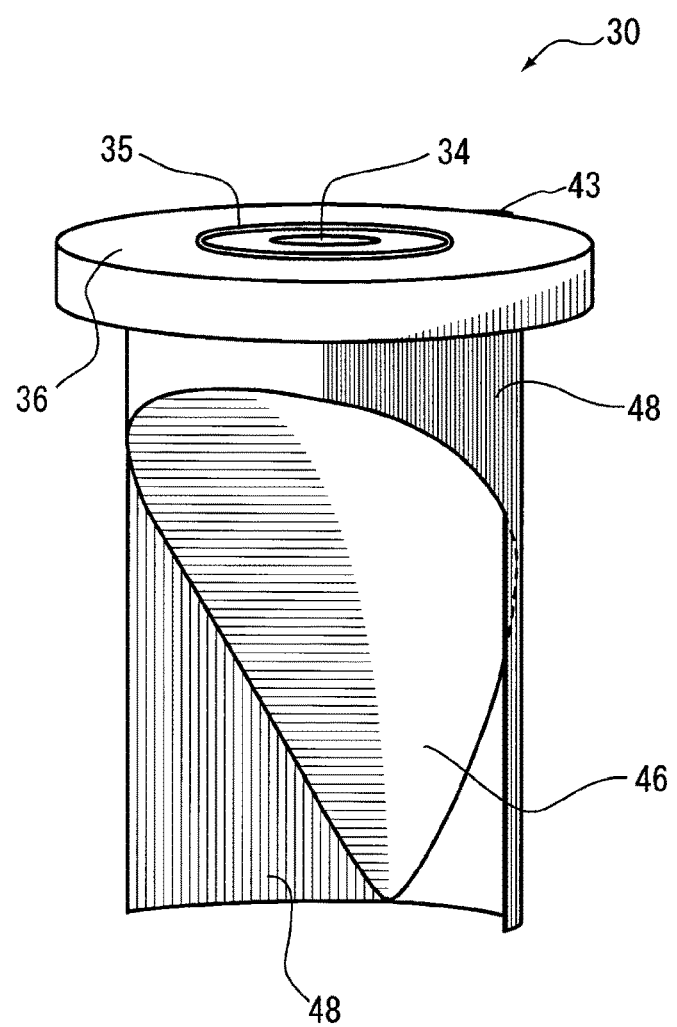
FIG. 6 is a perspective view illustrating a valve disc of the second embodiment.

FIG. 6 is a perspective view illustrating a valve disc 30 of this embodiment. The valve disc 30 is composed of a disc-like sliding part 36 and a three-dimensionally curved deflection surface 40. The sliding part 36 has the blind hole 34, the annular groove 35 and the protrusion 43 formed thereon. The blind hole 34, the annular groove 35 and the protrusion 43 are same as those in the first embodiment, and will not be explained repetitively.

The first partial cylindrical surface 46 has a shape of inverted water droplet with a pointed bottom end. The curving direction of the first partial cylindrical surface 46 lies in the vector sum of the inflow direction D1 and the passing direction D2. Accordingly, the fluid F input from the primary side of the body 10 pushes up the valve disc 30 to open it, and then smoothly deflected by the first partial cylindrical surface 46 to the passing direction D2. The second partial cylindrical surface 48 slides relative to the inner flange 26 to guide the reciprocating oscillation of the valve disc 30. The second partial cylindrical surface 48 is a cylindrical surface formed around the cylinder axis which lies in the same direction with that of the circumferential surfaces of the inflow cylinder 12 and the valve cylinder 18. The second partial cylindrical surface 48 is a skirt which suppresses vortex and turbulence from generating due to collision of the fluid F inside the valve cylinder 18.

Also with the check valve 100 of this embodiment, the backflow preventing function may be obtained at the boundary of crossed piping (for example, the suction part 212 and the transfer part 216: FIG. 4). Also the check valve 100 of this embodiment may be disposed at the overground part of the pumping system 1000 (see FIG. 4) to be used as a foot valve.

While the embodiment above exemplified an angle valve characterized by the axial directions of the inflow cylinder 12 and the outflow cylinder 16 cross each other, the present invention is not limited thereto. The check valve 1000 may be configured as the straight-type one characterized by the axial directions of the inflow cylinder 12 and the outflow cylinder 16 laid in parallel.

<Third Embodiment>

Figure 7A:
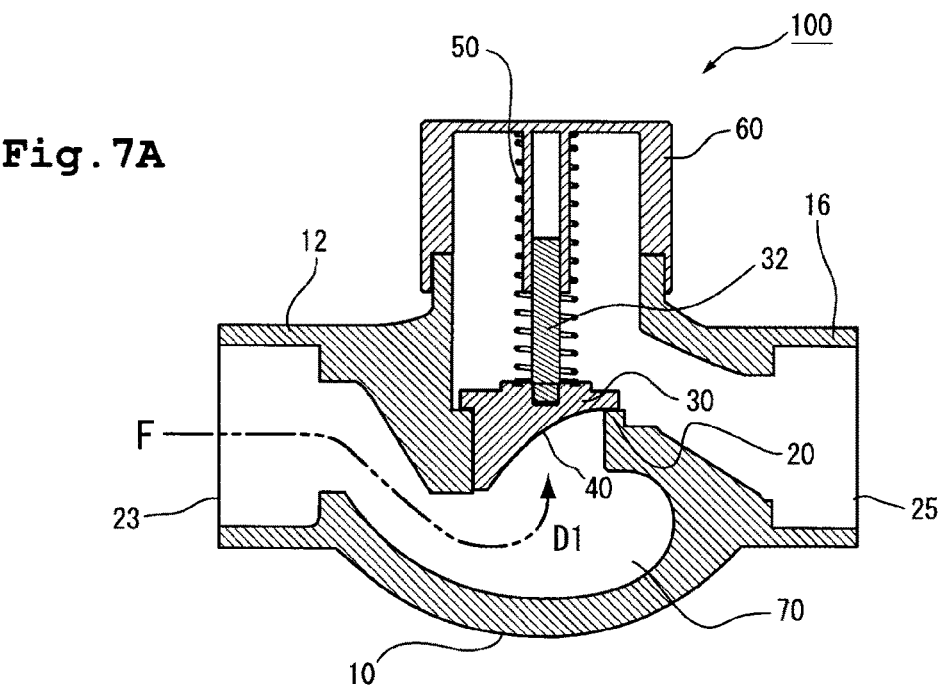
FIG. 7A-7B is a longitudinal cross-sectional view illustrating a closed state of the check valve of a third embodiment.
Figure 7B:
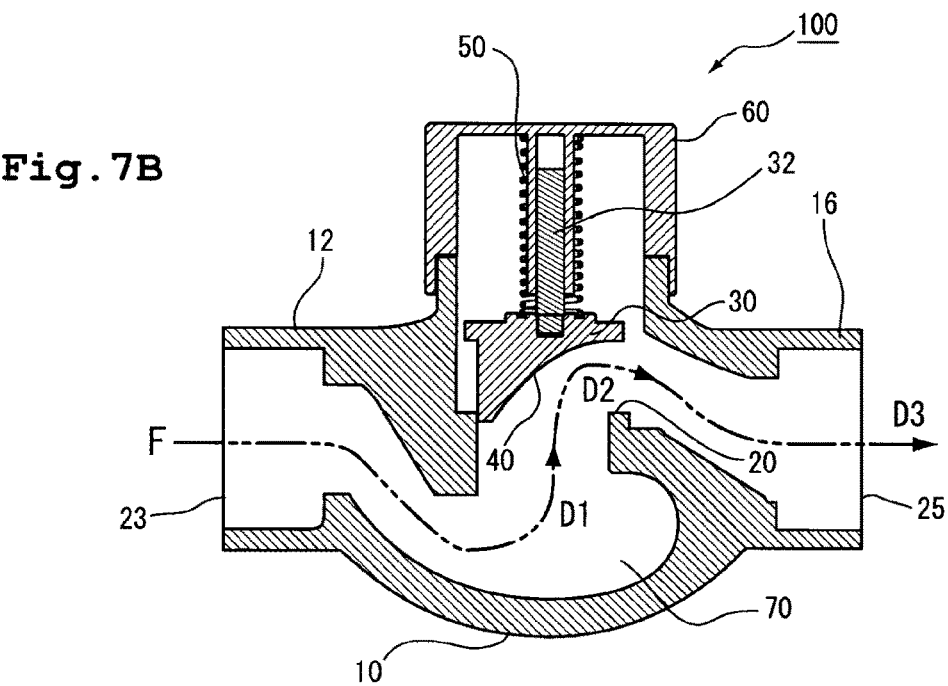

FIG. 7A and FIG. 7B are longitudinal cross-sectional view illustrating the check valve 100 of a third embodiment. FIG. 7A illustrates the closed state of the valve disc 30, and FIG. 7B illustrates the opened state of the valve disc 30. The check valve 100 of this embodiment is a straight valve characterized by the axial directions of the inflow cylinder 12 and the outflow cylinder 16 laid in parallel, and more specifically, agreed. The check valve 100 of this embodiment differs from the first and second embodiments, in that the axial direction of the inflow cylinder 12 crosses the longitudinal direction of the guide shaft 32, and more specifically, crosses at right angles.

The body 10 has a primary liquid reservoir 70 provided therein. The primary liquid reservoir 70 is disposed on the primary side of the valve seat 20. The deflection surface 40 faces to the primary liquid reservoir 70. In the closed state of the valve disc 30 (see FIG. 7A), when the fluid F is input through the opening 23 of the inflow cylinder 12, the internal pressure of the primary liquid reservoir 70 elevates, and if the pressure difference relative to the secondary side exceeds a predetermined minimum working pressure, as illustrated in FIG. 7B, the valve disc 30 is lifted up from the valve seat 20 to open the check valve 100.

The fluid F, input through the opening 23 of the inflow cylinder 12 and reached the primary liquid reservoir 70, then passes through the valve seat 20 as indicated by the inflow direction D1 which agrees with the direction of opening of the valve seat 20 (vertical direction in FIG. 7A and FIG. 7B). The fluid F having passed through the valve seat 20 is then guided along the deflection surface 40 as indicated by the passing direction D2 to pass through the valve disc 30. The fluid F then runs out from the opening 25 as indicated by the axial direction of the outflow cylinder 16 (discharge direction D3). Also in such straight lift-type check valve of this embodiment, the inflow direction D1 and the passing direction D2 cross when viewed before and after the passage through the valve seat 20. In this sort of check valve 100, by providing the deflection surface 40 on the primary side of the valve disc 30, the fluid F may be deflected smoothly from the inflow direction D1 to the passing direction D2. The head loss at the check valve 100 may therefore be reduced.

<Fourth Embodiment>

Figure 8A:
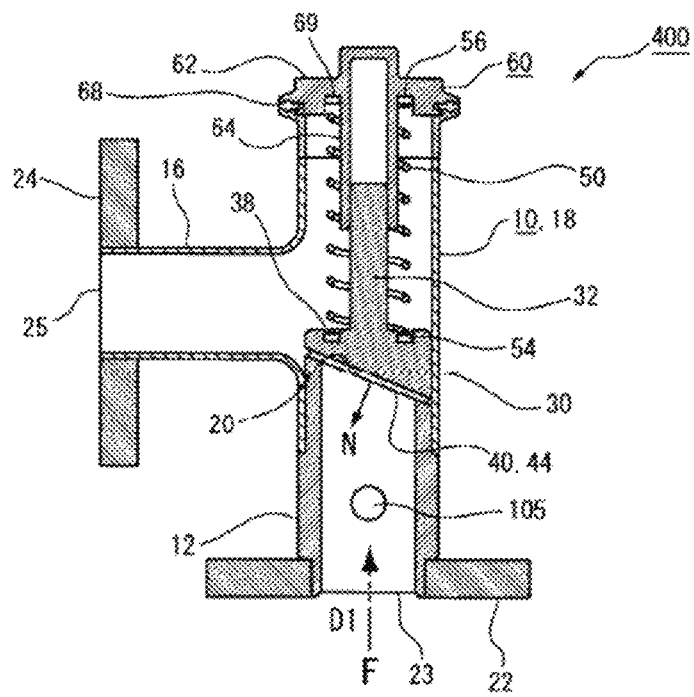
FIG. 8A-8B is a longitudinal cross-sectional view illustrating a closed state of the check valve of a fourth embodiment.
Figure 8B:
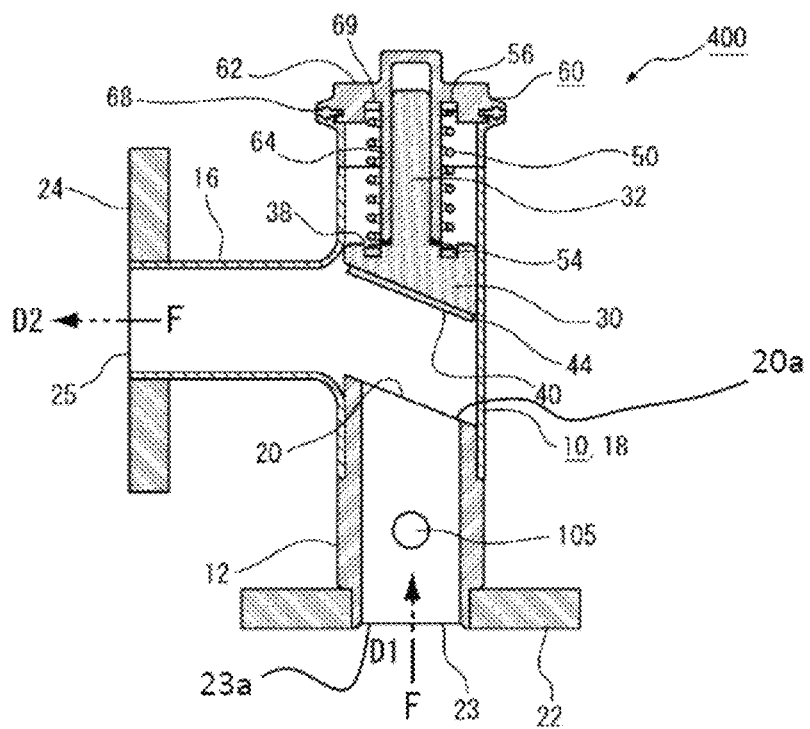
Figure 9:
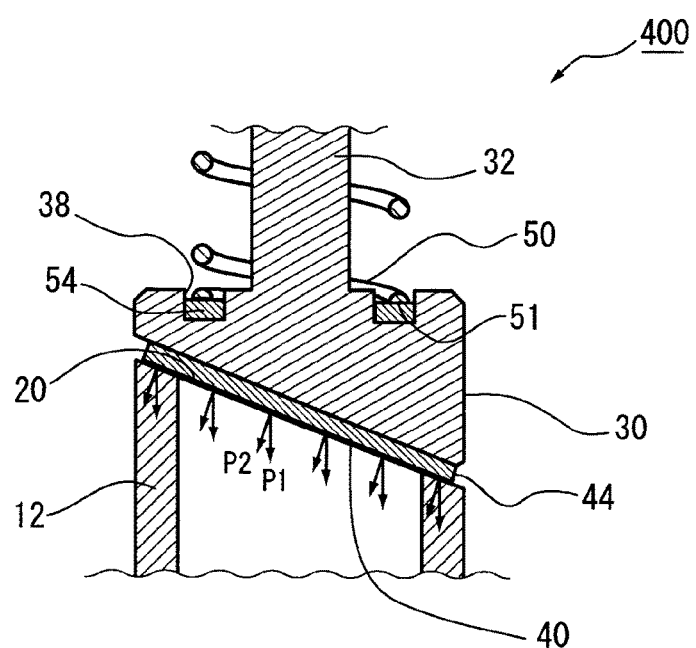
FIG. 9 is an explanatory drawing illustrating a closed state of the check valve of the fourth embodiment.

FIG. 8A is a longitudinal cross-sectional view illustrating the closed state of the check valve 400 of a fourth embodiment. FIG. 8B is a longitudinal cross-sectional view illustrating the opened state of the check valve 400 of this embodiment. FIG. 9 is an explanatory drawing illustrating the closed state of the check valve 400 of this embodiment.

The check valve 400 of this embodiment differs from the first embodiment, in that the deflection surface 40 is a flat inclined surface, and the normal line direction N of the deflection surface 40 and the inflow direction D1 of the fluid F cross at an angle smaller than 45°.

The crossing angle between the normal line direction N of the deflection surface 40 and the inflow direction D1 of the fluid F will now be explained. When deflection surface 40 is opposed at right angles to the inflow direction D1 of the fluid F input into the check valve 400, the crossing angle will be 0°. In other words, the supplementary angle of the angle, which is formed between the normal line vector (N) of the deflection surface 40 and the inflow vector (D1) of the fluid F, is referred to as the crossing angle of the normal line direction N of the deflection surface 40 and the inflow direction D1 of the fluid F. The crossing angle will occasionally be referred to as "the angle of inclination of the deflection surface 40".

The angle of inclination of the deflection surface 40 is preferably smaller than 45° as described above. In this range, the fluid F can push up the deflection surface 40 to effectively compress the elastic component 50, and changes the state of the check valve 400 from the closed state illustrated in FIG. 8A to the opened state illustrated in FIG. 8B.

In the check valve 400 of this embodiment characterized by the inflow direction D1 of the fluid F and the passing direction D2 cross at 90°, the angle of inclination of the deflection surface 40 is preferably 15° or larger and 22.5° or smaller. In other words, the angle of inclination of the deflection surface 40 is preferably ⅙ or larger and ¼ or smaller, with respect to the crossing angle between the inflow direction D1 and the passing direction D2. In this range, the fluid F input to the check valve 400 will have a less content of lateral component in the force of pressurizing the deflection surface 40, and thereby the sliding friction of the guide shaft 32 will be reduced. The input fluid F may be deflected to the passing direction D2, without being slowed down excessively. The pressure loss of the fluid F passing through the check valve 400 will be well reduced.

The valve disc 30 has a non-uniform thickness, wherein the thickness monotonously changes to be minimized on the side closer to the opening 25 (on the left in FIG. 8A). The bottom face of the valve disc 30 inclines relative to the inflow direction D1 of the fluid F. On the bottom face of the valve disc 30, a resin sheet 44 is attached. The resin sheet 44 is a water-tight, sheet-like sealing component held between the valve seat 20 and the valve disc 30. The deflection surface 40 of this embodiment is formed by the resin sheet 44. The resin sheet 44 (sealing component) may be configured by a closed-cell foam resin material. The resin sheet 44 is flat and has a uniform thickness. The bottom face of the resin sheet 44 configures the deflection surface 40. The inflow cylinder 12 has a first end surface 23a and a second end surface 20a.

By virtue of the closed-cell structure of the resin sheet 44, the primary side and the secondary side of the check valve 400 do not communicate through the resin sheet 44, and this ensures a good water-tightness. If the resin sheet 44 had an open-cell structure, the deflection surface 40 and the side circumferential face of the resin sheet 44 would communicate, causing leakage of water even in the closed state of the valve disc 30. In contrast, by using a resin material with closed cells as the resin sheet 44 as in this embodiment, the valve disc 30 will have a good water cut-off performance in the closed state. More specifically, a high water cut-off performance of the check valve 400 may be obtained by a synergistic effect of a high sealability of the valve seat 20 attributable to the flexibility of the resin sheet 44, and water-tightness of the resin sheet 44 per se. In addition, since the resin sheet 44 has a closed-cell structure, the resin sheet 44 even if wetted with the fluid F will not be moistened deep inside, so that the flexibility and deformability of the resin sheet 44 will not be degraded. In addition, a connecting part between the resin sheet 44 and the valve disc 30 will not be eroded by the fluid F immersed into the resin sheet 44.

The deflection surface 40 of this embodiment appears flat. As illustrated in FIG. 9, in the closed state of the check valve 400, pressurizing force P1, by which the valve disc 30 is pressurized in the axial direction against the valve seat 20 by aid of elastic restoring force of the elastic component 50 compressed from its natural length, is uniform over the whole circumference of the valve seat 20. Also since the angle of inclination of the resin sheet 44 is uniform, a force component P2, which acts in the thickness-wise direction of the resin sheet 44, of the pressurizing force P1 is uniform over the whole circumference of the valve seat 20. Also since the resin sheet 44 is uniform in thickness, the compressive strain in the thickness-wise direction of the resin sheet 44 is uniform. Accordingly, the close contactness between the resin sheet 44 and the valve seat 20 in the closed state will be uniform over the whole circumference of the valve seat 20, and thereby the water cut-off performance of the check valve 400 of this embodiment improves.

As for characteristic of the resin sheet 44, compressive permanent strain (30 minutes) measured in compliance with JIS K6767 is preferably 10 times or more larger than compressive permanent strain (24 hours), and more preferably 15 times or more. More specifically, the resin sheet 44 of this embodiment preferably has a water cut-off performance parameter given by the mathematical formula (1) below, of 10 or larger, and more preferably 15 or larger.

Water cut-off performance parameter=Compressive permanent strain(30 minutes)/compressive permanent strain(24 hours)    (1)

Now, the compressive permanent strain (30 minutes) is defined as the thickness of a test piece, obtained by compressing the piece according to ISO 1856 to give a 25% strain from the initial thickness, allowing it to stand at 23° C.±2° C. for 22 hours, and measuring the thickness of the test piece 30 minutes after the end of compression. The compressive permanent strain (24 hours) is defined as the thickness of a test piece, obtained similarly by allowing it for 22 hours, and measuring the thickness 24 hours after the end of compression. A large value of the compressive permanent strain (30 minutes) means that the resin sheet 44 has a high deformation retaining property, meanwhile a large value of compressive permanent strain (24 hours) means that the resin sheet 44 has a high shape restorability.

If the water cut-off performance parameter given by the mathematical formula (1) is ten or larger, and preferably 15 or larger, the water cut-off performance of the check valve 400 is preferably ensured over a long period. This is because, if the compressive permanent strain (30 minutes) is large enough, the valve seat 20 will intrude into the resin sheet 44 in the closed state of the check valve 400 so as to establish close contact in a water-tight manner. The resin sheet 44 is, however, suppressed from being deformed permanently, such as kept in the intruded shape, by virtue of its smallness in the compressive permanent strain (24 hours). In this way, water leakage, otherwise possibly caused by strain of the resin sheet 44, is successfully avoidable even if the relative position between the valve seat 20 and the resin sheet 44 slightly changes due to oscillation of the valve disc 30 which opens and closes.

Foam resin materials composing the resin sheet 44 is selectable from polyvinyl chloride foam, olefin foam, urethane foam, and fluorine-containing rubber foam. Also non-foamed resin materials are usable for the resin sheet 44. Usable non-foamed resin materials include soft resin materials exemplified by ethylene-vinyl acetate copolymer (EVA) and fluorine-containing rubber.

The check valve 400 of this embodiment is different from the first embodiment, in that the valve disc 30 and the cap part 60 are rotatable to each other, and that the elastic component 50 is compressed in a non-fixed manner against at least one of the valve disc 30 and the cap part 60. The elastic component 50 is compressed in a non-fixed manner against one of the valve disc 30 and the cap part 60. The elastic component 50 may be joined to the other in a fixed manner. The valve disc 30 and the cap part 60 are separable.

At least one of the valve disc 30 and the cap part 60, compressed by the elastic component 50 in a non-fixed manner, is provided with resin components (resin pads 54, 56) which frictionally hold the end of the elastic component 50. Both ends of the elastic component 50 of this embodiment are fixed neither to the cap part 60 nor the valve disc 30. The valve disc 30 has, formed on the top face thereof, an annular recess 38. The recess 38 is fitted with the annular resin pad 54. Also a similar recess 69 is formed on the bottom face of the top plate 62 of the cap part 60. The recess 69 is fitted with the annular resin pad 56.

The resin pad 54 and the resin pad 56 may be composed of the same material, or different materials. The resin sheet 44, the resin pad 54 and the resin pad 56 may be formed using a common material, that is, a closed-cell foam resin material.

In the closed state of the check valve 400 illustrated in FIG. 8B, the elastic component 50 is kept compressed. The bottom end of the elastic component 50 is pressurized against the resin pad 54, and the top end is pressurized against the resin pad 56. In the check valve 400 of this embodiment, the elastic component 50 is compressed from its natural length even in the opened state of the check valve 400 illustrated in FIG. 8A. The bottom end of the elastic component 50 is pressurized against the resin pad 54 so as to be frictionally held thereon. Similarly, the top end of the elastic component 50 is pressurized against the resin pad 56 so as to be frictionally held thereon. In this way, the elastic component 50 is suppressed from rotating around the guide shaft 32, both relative to the cap part 60, and relative to the valve disc 30.

As illustrated in FIG. 9, a bottom end face 51 of the elastic component 50 is ground flat. More specifically, the bottom end face 51 is ground to a depth of approximately half of the thickness of a coil of the elastic component 50. With this configuration, the bottom end face 51 and the resin pad 54 come into surface contact, thereby the elastic component 50 is suppressed from causing the axial rotation under a large frictional force. Also the top end face (not illustrated) of the elastic component 50 is ground flat, and comes into contact with the resin pad 56.

The elastic component 50 has an elastic restoring force against torsional deformation. Accordingly, the valve disc 30 and the cap part 60 are suppressed from axially rotating around the guide shaft 32, with the aid of the resin pads 54, 56 and the elastic component 50. The check valve 400 of this embodiment has no guiding part, that is, the keyway 52 and the protrusion 43 (see FIG. 1), so that the relative axial rotation between the valve disc 30 and the cap part 60 is not inhibited. However, as described above, the relative axial rotation of the valve disc 30 and the cap part 60 is restricted frictionally and elastically. Therefore, before and after the oscillation of the valve disc 30 which opens and closes upon input of the fluid F, the position of the valve disc 30 relative to the valve seat 20 is well reproduced. For this reason, it is no longer necessary to provide the keyway to the inner surface of the valve cylinder 18 of this embodiment, and this improves working easiness of the check valve 400.

The valve cylinder 18 of the body 10 and the cap part 60 are pressed into water-tight contact, while placing a seal 68 in between. The valve cylinder 18 and the cap part 60 are clamped with a ferrule joint (not illustrated). With this configuration, the valve disc 30 and the elastic component 50 may be detached from the body 10, simply by unlocking the ferrule joint to separate the cap part 60 from the valve cylinder 18. When the check valve 400 is assembled, the valve disc 30 attached with the resin sheet 44 is inserted into the valve cylinder 18, and the elastic component 50 is fitted around the guide shaft 32. The cap part 60 is attached to the opening of the valve cylinder 18, while aligning the directions of inclination of the deflection surface 40 and the valve seat 20, and clamped with the ferrule joint. The elastic component 50 is compressed, and both ends thereof are pressurized respectively against the resin pads 54, 56. In this way, the elastic component 50 is frictionally restricted from rotating relative to the valve disc 30 and the cap part 60. According to this embodiment, the check valve 400, in which the attitude of the deflection surface 40 and the valve seat 20 is stably reproduced, is provided only by simple assembly works.

Figure 10A:
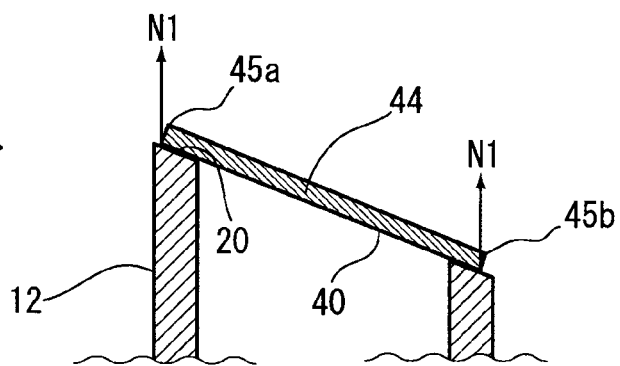
FIG. 10A-10B is an explanatory drawing illustrating a resin sheet.
Figure 10B:
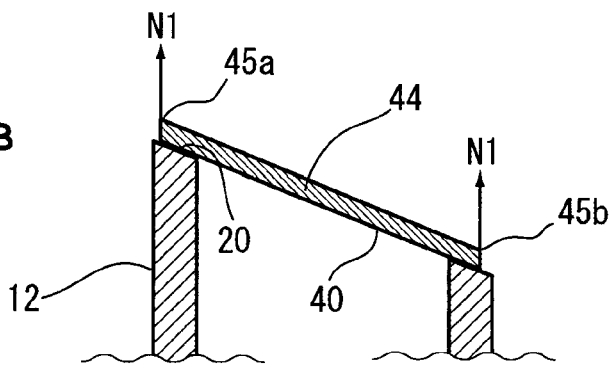

FIG. 10A is an explanatory drawing illustrating a vertical cross-section of the resin sheet 44 and the valve seat 20 of this embodiment. FIG. 10B is an explanatory drawing illustrating a modified example of the resin sheet 44. The resin sheet 44 of this embodiment illustrated in FIG. 10A has a front edge 45*a* and a rear edge 45*b* which rise up in the normal line direction of the inclined valve seat 20. Since the circumferential face of the resin sheet 44 of this embodiment rises up in parallel to the thickness-wise direction, the resin sheet 44 is easily worked. On the other hand, the resin sheet 44 of the modified example differs from this embodiment, in that it has a front edge 45*a* and a rear edge 45*b* which rise up in parallel with the axial direction of the inflow cylinder 12 (vertical direction in the drawing). In other words, the resin sheet 44 of this embodiment illustrated in FIG. 10A has a uniform thickness when viewed in the thickness-wise direction, meanwhile the resin sheet 44 of the modified example illustrated in FIG. 10B has a uniform thickness when viewed in the axial direction.

As illustrated in FIG. 9, the pressurizing force P1, by which the valve disc 30 is pressurized against the valve seat 20 by aid of elastic restoring force of the elastic component 50, acts in the axial direction of the check valve 100. As illustrated in FIG. 10A and FIG. 10B, reaction force N1 against the pressurizing force P1 is exerted in the axial direction from the valve seat 20 to the resin sheet 44. Since the resin sheet 44 of the modified example illustrated in FIG. 10B has a uniform thickness as viewed in the axial direction, so that the amount of strain of the resin sheet 44 compressed by the reaction force is uniform over the entire range from the front edge 45a to the rear edge 45b. For this reason, this is superior to the resin sheet 44 illustrated in FIG. 10A in terms of water cut-off performance of the valve seat 20.

The check valve 400 of this embodiment was described above referring to the case where water is stopped by covering the top face of the valve seat 20, which corresponds to the top end face of the inflow cylinder 12, with the resin sheet 44 attached to the bottom face of the valve disc 30. As an alternative to the above, the shape and size of the valve disc 30 are made suitable for fitting in the inflow cylinder 12, so as to stop water by closing the inflow cylinder 12 with the valve disc 30. More specifically, the check valve 400 may be configured as a poppet valve having the circular conical valve disc 30 which is thinned downwards.

The check valve 400 of this embodiment is configured to restrict the axial rotation of the valve disc 30, with the aid of the frictional force between the elastic component 50 and the resin pads 54, 56. As an alternative to the above, it is possible to provide a guiding part which guides the valve disc 30 so as to slide in a non-rotatable manner relative to the cap part 60. More specifically, just like the protrusion 43 and the keyway 52 in the first embodiment, a guiding part which restricts the axial ration between the valve disc 30 and the valve cylinder 18 may be provided. Alternatively, the guide shaft 32 and the straight cylinder 64 may be provided with non-circular cross sectional parts which can engage mutually, so as to restrict the relative axial rotation. These non-circular cross sectional parts correspond to the guiding part. More specifically, the outer circumferential shape of the guide shaft 32 and the inner circumferential shape of the straight cylinder 64 may be a non-circular shape such as oval, or semi-circle or partial circle obtained by cutting a circle with a chord. The non-circular cross sectional part may be provided over the entire length or a partial length of the guide shaft 32 and the straight cylinder 64. More specifically, it is preferable to form the guiding part while shaping the opening at around the opened end (bottom end in FIG. 8A) of the straight cylinder 64 into a non-circular shape, and to shape the opening in the middle and upper parts, other than the part at around the opened end, into a circular shape. On the other hand, it is preferable to form the guide shaft 32, so that an entire length of portion thereof to be inserted into the straight cylinder 64 will have a non-circular cross sectional shape corresponding to the opened end of the straight cylinder 64. By thus limiting the length of the part of the straight cylinder 64, in which the opening needs to be shaped into non-circular form, within a localized range, working accuracy may be improved, working cost may be reduced, and sliding friction of the guide shaft 32 which guides the reciprocating oscillation of the guide shaft 32 may be reduced. By restricting the relative axial rotation of the straight cylinder 64 and the guide shaft 32, by mutual fitting of the non-circular cross sectional parts, the valve disc 30 may be reciprocatingly oscillated, while always keeping the directions of inclination of the deflection surface 40 and the valve seat 20 matched to each other.

As illustrated in FIG. 8A, FIG. 8B, the check valve 400 is same as the first embodiment in that it has the body 10 which houses the valve seat 20 and the valve disc 30. The check valve 400 of this embodiment differs from the first embodiment in that the body 10 has a pressure reducing port 105 formed on the primary side UP of the valve disc 30. The pressure reducing port 105 is formed in the body 10 of this embodiment, and more specifically in the circumferential surface of the inflow cylinder 12. Purpose of the pressure reducing port 105 will be explained referring to FIG. 11.

Figure 11:
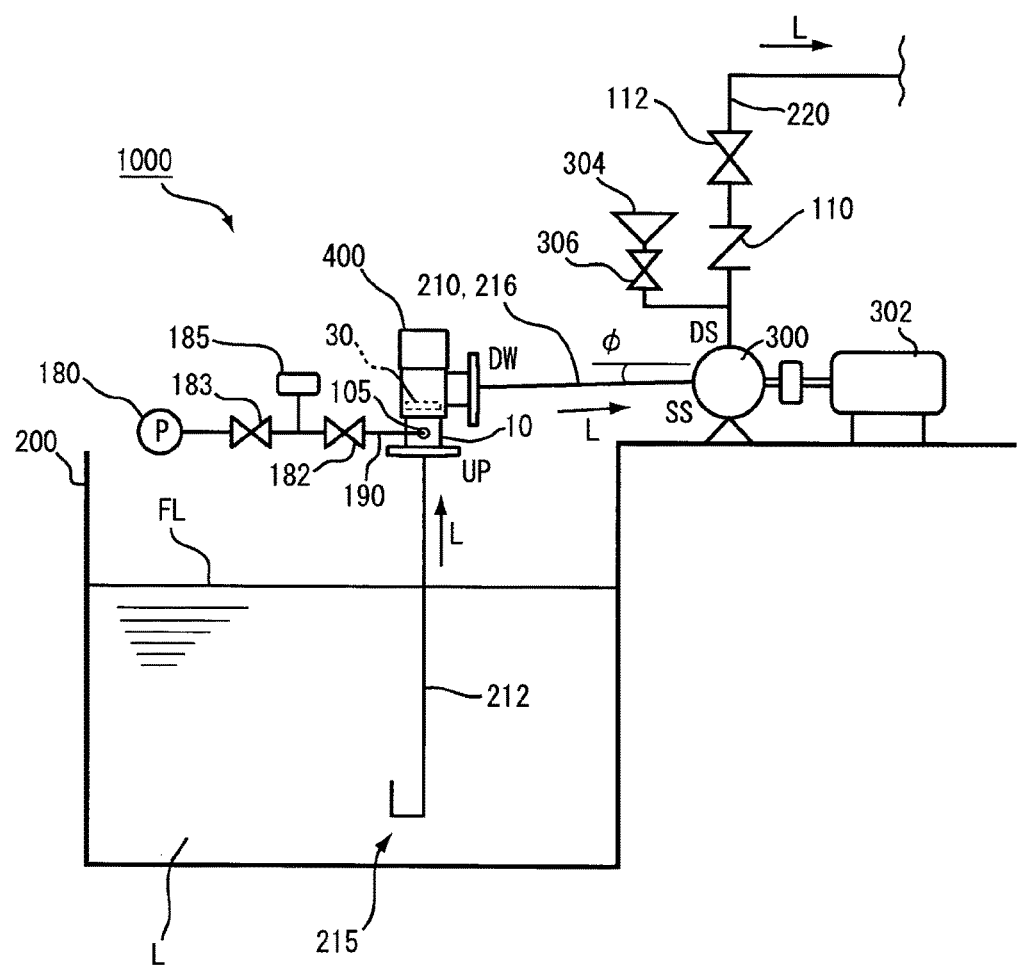
FIG. 11 is a configuration chart of a pumping system of the second embodiment.
Figure 12A:
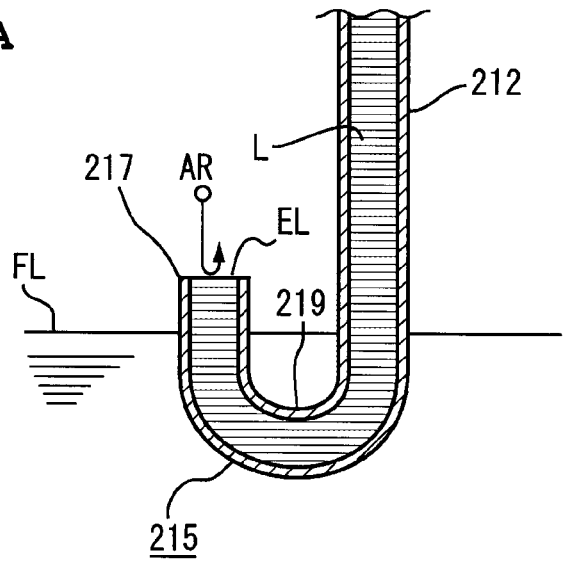
FIG. 12A-12B is a schematic cross-sectional view illustrating a first example of a bottom end of a suction pipe.
Figure 12B:
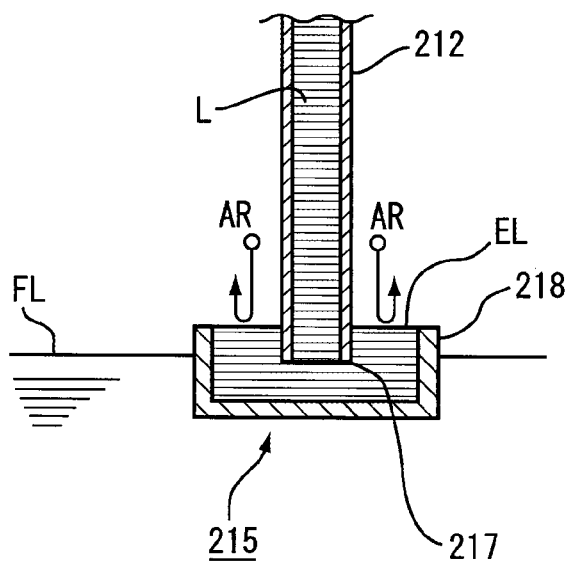

FIG. 11 is a configuration chart illustrating a pumping system 1000 according to a second embodiment of the present invention. FIG. 12A is a schematic cross-sectional view illustrating a first example of a bottom end 215 of a suction pipe 210. FIG. 12B is a schematic cross-sectional view illustrating a second example of the bottom end 215 of the suction pipe 210.

To primary side UP of the check valve 400, connected is a suction part 212 of the suction pipe 210. To the secondary side DW of the check valve 400, connected is the transfer part 216 of the check valve 400. The suction part 212 communicates with the inside of the liquid reservoir 200, and the transfer part 216 communicates with the pump 300. The check valve 400 allows the liquid L to flow unidirectionally from the primary side UP to the secondary side DW. In the downtime of the pump 300, the primary side UP (suction part 212) of the suction pipe 210 is filled with the liquid L, and is kept under a negative pressure.

The bottom end 215 of the suction pipe 210 opens perpendicularly upward in the liquid reservoir 200. FIG. 12A and FIG. 12B illustrate states where the liquid level FL descends from the state illustrated in FIG. 11, below the bottom end 215 of the suction pipe 210. This state occurs when a predetermined amount or more of the liquid L, reserved in the liquid reservoir 200, was pumped up by the pump 300. As a result of the water cut-off performance of the check valve 400, the liquid surface EL at the bottom end 215 of the suction pipe 210 is applied with the atmospheric pressure. If the bottom end 215 of the suction pipe 210 opened downward, the air would enter the suction pipe 210 when the liquid surface EL is destabilized by oscillation of the liquid surface EL in the liquid reservoir 200 or contact with an ambient air flow, resulting in waterfall.

In contrast, the bottom end 215 of the suction pipe 210 of the first embodiment illustrated in FIG. 12A is bent approximately 180 degrees to direct the pipe end 217 upward. The liquid surface EL in the suction pipe 210 resides in the vicinity of the pipe end 217. Accordingly, the pumping system 1000 sucks and then feeds the liquid L from the top of the bottom end 215 of the suction pipe 210. The liquid reservoir 200 may contain, as sedimented at the bottom thereof, sludge or other foreign matters having a gravity larger than that of the liquid L. If the bottom end of the suction pipe opened downward, the foreign matters at the bottom would be sucked easily. It would therefore be necessary to position the bottom end far enough above the bottom of the liquid reservoir 200, in order to avoid suction of the foreign matter. For this reason, when the bottom end of the suction pipe opened downward, the liquid L at around the bottom of the liquid reservoir 200 could not be pumped up, wasting much of the liquid L. In contrast, when the bottom end 215 of the suction pipe 210 of the pumping system 1000 opens upward with the closed bottom as seen in the pumping system 1000 of this embodiment, the foreign matters at the bottom of the liquid reservoir 200 is less likely to be suck up, so that the bottom end 215 may be positioned close to the bottom. The liquid L may therefore be used efficiently without wasting it.

The bottom end 215 of the suction pipe 210 of the second embodiment illustrated in FIG. 12B has a pipe end 217 of the suction pipe 210 which opens downward, and a water retaining part 218 which opens upward and houses the pipe end 217. The liquid surface EL in the suction pipe 210 resides close to the top face of the water retaining part 218. The pipe end 217 of the suction pipe 210 is positioned below the liquid surface EL, and is immersed in the liquid L. The pipe end 217 and the water retaining part 218 are connected in an integrated manner. The area of the opened top face of the water retaining part 218, or the area of the liquid surface EL, is now referred to as aperture area. The aperture area of the water retaining part 218 is preferably larger than the aperture area of the pipe end 217 of the suction pipe 210, but not specifically limited.

As illustrated in FIG. 12A and FIG. 12B, the suction pipe 210 is filled with the liquid L up to the bottom end 215, and the bottom end 215 (pipe end 217 or water retaining part 218) opens upward. Accordingly, the air AR can enter the suction pipe 210 only when the air AR succeeds to sink below the liquid surface EL and to go across the lowest part of the suction pipe 210. Now, the lowest part of the suction pipe 210 is a bent part 219 of the bottom end 215 in the first example illustrated in FIG. 12A, and is the pipe end 217 in the second example illustrated in FIG. 12B. Even if the liquid surface EL in the suction pipe 210 should be destabilized, the air AR is unlikely to enter the suction pipe 210. The suction pipe 210 of this embodiment can therefore be kept primed irrespective of the level of the liquid surface FL in the liquid reservoir 200. Accordingly, even if the level of the liquid surface FL in the liquid reservoir 200 should temporarily go down below the bottom end 215, it is possible to restart the pumping-up of the liquid L, by stopping the operation of the pump 300 before the suction part 212 becomes empty, and by restoring the level of the liquid surface EL.

By providing the water retaining part 218 at the pipe end 217 so as to direct upward as in the second example illustrated in FIG. 12B, the liquid surface EL is now easily stabilized without bending the bottom end 215 of the suction pipe 210.

The minimum area of the flow path in the bottom end 215, which ranges from the suction part 212 of the suction pipe 210 to the liquid surface EL, is equal to the aperture area of the suction part 212 of the suction pipe 210. In other words, the bottom end 215 has no bottleneck of the flow path in the suction pipe 210. More specifically, the aperture area of the bent part 219 and the pipe end 217 which compose the bottom end 215 of the first example; and the flow path area inside the water retaining part 218 which composes the bottom end 215 of the second example are equal to, or larger than, the aperture area of the suction part 212 of the suction pipe 210. The bottom end 55 may thus be opened upward, without causing shortage of suction of the liquid L.

According to the pumping system 1000, water drainage from the suction part 212 of the suction pipe 210 may be prevented effectively by a synergistic effect of the water cut-off performance of the check valve 400, and the upward opening of the bottom end 215. With this configuration, for example in the process of internal inspection of the liquid reservoir 200 with the liquid L drained off, the suction part 212 of the suction pipe 210 is kept primed. Accordingly, by re-filling the liquid reservoir 200 with the liquid L, the pump 300 can immediately restart the pumping-up without re-priming the suction pipe 210.

The pressure reducing port 105 is an air intake which allows the inside and the outside of the body 10 to communicate therethrough, and reduces the pressure in the body 10, particularly in the primary side UP of the valve disc 30. The pressure reducing port 105 is connected with a piping 190. The piping 190 is provided with on-off valves 182, 183 which open or close the flow path. To a flow path between the on-off valve 182 and the on-off valve 183, a pressure gauge 185 for measuring static pressure in the piping 190 is connected.

The pressure reducing port 105 is connected with a vacuum pump 180. More specifically, the vacuum pump 180 is provided on the downstream side of the on-off valve 183, or at the end of the piping 190. The vacuum pump 180 sucks up the air inside the piping 190 without priming. By operating the vacuum pump 180 by opening the on-off valves 182, 183, the pressure in the piping 190, the primary side UP of the body 10, and the suction part 212 of the suction pipe 210 becomes negative, thereby the liquid L is sucked up. In this way, the body 10 and the suction part 212 of the suction pipe 210 are initially primed, while leaving the valve disc 30 of the check valve 400 closed. The on-off valve 183 in this state is kept closed. As a consequence, in the downtime of the pump 300, the primary side UP (suction part 212) of the suction pipe 210 is filled with the liquid L, and kept under a negative pressure.

The pump 300 of this embodiment is an inverter pump. Types of systems of the inverter pump are not specifically limited. Available systems include both of PWM (Pulse Width Modulation) system which controls output of the pump by varying current flow rate, and PAM (Pulse Amplitude Modulation) system which controls the output of the pump by varying voltage value. By the nature of the working pressure which is initially low and then gradually increases, the inverter pump is good at energy saving, but takes time for the initial priming when the primary side UP of the check valve 400 is not primed. Now, the valve disc 30 is closed in the initial state, so that the suction part 212 is not allowed for water flow even if the suction pipe 210 is fed with priming water from the priming tank 304. In this embodiment, since the suction part 212 of the suction pipe 210 may be initially primed using the vacuum pump 180, pumping may be started quickly even if the inverter pump is used for the pump 300.

The pressure gauge 185 connected to the piping 190 is a vacuum gauge which measures pressure lower than the atmospheric pressure. While operating the pump 300 to pump up the fluid F, it is preferable to open the on-off valve 182, to close the on-off valve 183, and to measure the static pressure of the piping 190 using the pressure gauge 185. The pressure measured by the pressure gauge 185 is absolute pressure or gauge pressure of the static pressure of the primary side UP of the body 10. If the absolute pressure is lower than the atmospheric pressure, or the gauge pressure is negative, the suction part 212 is found to be primed at a level higher than the liquid surface FL. The absolute value of the gauge pressure (negative pressure) and the level of priming water inside the suction part 212 (height from the liquid surface FL) are convertible. If the gauge pressure measured by the pressure gauge 185 reaches a predetermined pressure (negative pressure) which is determined based on the height of the valve disc 30 above the liquid surface FL, the primary side UP of the valve disc 30 is found to be completely primed. To the contrary, when the gauge pressure measured by the pressure gauge 185 is substantially zero, the primary side UP of the valve disc 30 is found to cause waterfall.

While the pump 300 operates and pumps up the liquid L, the absolute value of the gauge pressure (negative pressure) measured by the pressure gauge 185 further increases. According to this embodiment, it now becomes possible to determine whether the liquid L is normally pumped up or not, based on the measured value of the pressure gauge 185.

As described above, by connecting the pressure gauge 185 to the primary side UP of the body 10 and measuring the static pressure, the level of priming water inside the suction part 212 becomes detectable in a quantitative manner. In this way, even when the check valve 400 is disposed not at the end of the suction part 212 but in the middle way thereof as in this embodiment, it now becomes possible to confirm whether the primary side UP is initially primed to a sufficient degree. It is also possible to determine whether the liquid L is normally pumped up or not. In this way, dry-run of the pump 300 is quickly detected, so as to avoid seizure of the pump 300.

<Fifth Embodiment>

Figure 13:
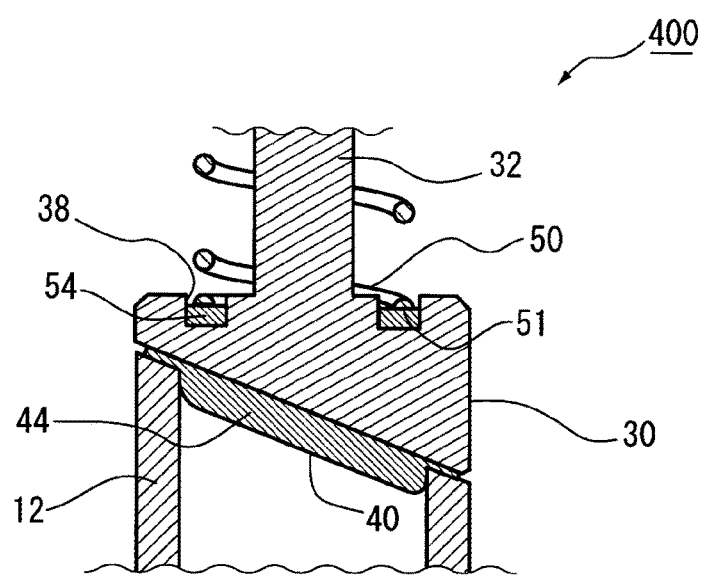
FIG. 13 is an explanatory drawing illustrating a closed state of the check valve of a fifth embodiment.
Figure 14:
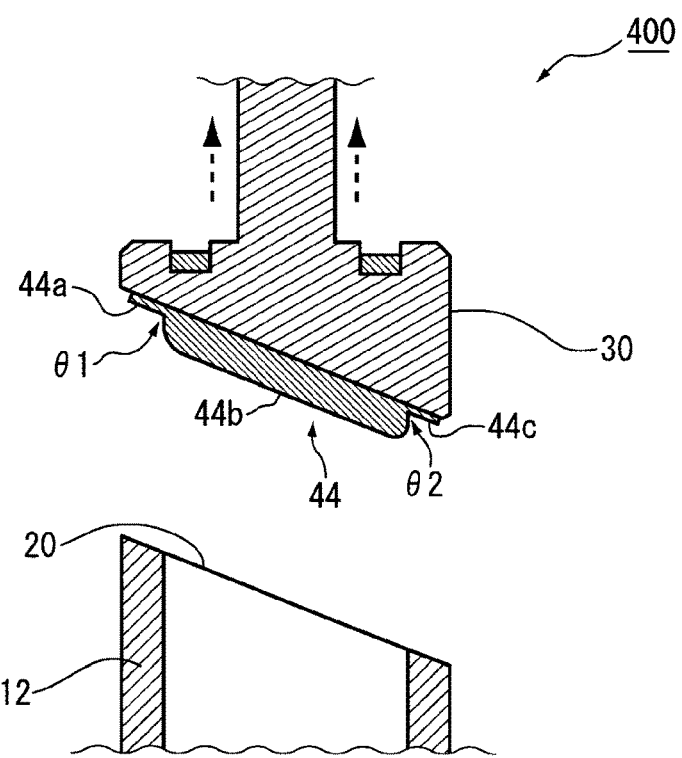
FIG. 14 is an explanatory drawing illustrating an opened state of the check vale of the fifth embodiment.

FIG. 13 is an explanatory drawing illustrating the closed state of the check valve 400 according to a fifth embodiment of the present invention. FIG. 14 is an explanatory drawing illustrating the opened state where the valve disc 30 of the check valve 400 of the fifth embodiment lifts up in the direction indicated by the broken line arrow, to be kept above the valve seat 20. FIG. 14 does not show the elastic component 50.

The check valve 400 of this embodiment is same as the second embodiment in that it has the resin sheet 44 which is a water-tight and sheet-like sealing component held between the valve seat 20 and the valve disc 30. This embodiment is also same as the second embodiment in that the sealing component is composed of a closed-cell foam resin material.

The sealing component (resin sheet 44) of this embodiment has circumferential parts 44a, 44c held between the valve seat 20 and the valve disc 30, and a stopper part 44b provided inside the circumferential parts 44a, 44c so as to be contiguous therefrom. The circumferential parts 44a, 44c are relatively thin, and the stopper part 44b is formed thicker than the circumferential parts 44a, 44c. The circumferential parts 44a, 44c and the stopper part 44b are molded from a single material in an integrated manner. The stopper part 44b is a center bulged part, whereas the circumferential parts 44a, 44c are flat flanges.

The stopper part 44b configures the deflection surface 40. The angle of inclination of the deflection surface 40 is smaller than 45°. As illustrated in FIG. 14, a region which falls on the upper side of the inclined resin sheet 44 is referred to as the circumferential part 44a, and a region which falls on the lower side of the inclined resin sheet 44 is referred to as the circumferential part 44c.

The top face of the resin sheet 44 is flat, and is attached to the bottom face of the valve disc 30. The stopper part 44b is formed so as to bulge from the bottom face of the resin sheet 44. The resin sheet 44 has a circular shape, and has annular circumferential parts 44a, 44c having a predetermined width formed on the outer periphery. The stopper part 44b is a cylindrical part which bulges downward from the circumferential parts 44a, 44c. The thickness of the circumferential parts 44a and 44c may be same or different.

As illustrated in FIG. 14, the angle of inclination θ1 at which the stopper part 44b rises up from the circumferential parts 44a is an obtuse angle, whereas the angle of inclination θ2 at which the stopper part 44b rises up from the circumferential part 44c is an acute angle. The circumferential surface of the stopper part 44b, which is the surface rising from the circumferential parts 44a, 44c extends along the inner circumferential surface of the inflow cylinder 12. The stopper part 44b rises up from the circumferential parts 44a, 44c obliquely, rather than perpendicularly.

More specifically, the stopper part 44b forms an oblique cylinder which rises up from the circumferential parts 44a, 44c towards the oscillation direction (vertical direction in FIG. 13) of the valve disc 30. In the closed state of the valve disc 30 (see FIG. 13), the sealing component (resin sheet 44) comes into close contact with the valve seat 20 in a three-dimensional manner. Now, "the resin sheet 44 comes into close contact with the valve seat 20 in a three-dimensional manner" means that the resin sheet 44 is brought into close contact not only with the surface of the valve seat 20, but also with other surface contiguous from the surface of the valve seat 20. In this embodiment, as illustrated in FIG. 13, the resin sheet 44 comes into close contact not only with the valve seat 20, but also with the inner circumferential surface of the inflow cylinder 12.

Methods of manufacturing the resin sheet 44 having the stopper part 44b is not specifically limited. The circumferential parts 44a, 44c may be formed by cutting a flat sheet-like resin material nearly as thick as the stopper part 44b. Alternatively, such resin material may be pressed to form the circumferential parts 44a, 44c. For the press forming, the inflow cylinder 12 and the valve disc 30 of the check valve 400 may be used as stamping dies, or stamping dies having dimensions same as those of these components may be used.

The resin sheet 44 of this embodiment is formed using the closed-cell foam resin material as described above. Even when the check valve 400 is exposed to water flow, and the resin sheet 44 is brought into contact with water, the resin sheet 44 is prevented from being wetted deep inside below the surface. The inner cells of the resin sheet 44 are filled with a gas phase even when the check valve 400 is exposed to water flow, and this ensures the resin sheet 44 to keep a good deformability. Accordingly, when the valve disc 30 is closed after being exposed to water flow, the circumferential parts 44a, 44c are pressurized between the valve seat 20 and the valve disc 30, and immediately compressed to seal the gap between the valve seat 20 and the valve disc 30 in a water-tight manner. The stopper part 44b is slightly pressurized against the inner circumferential surface of the inflow cylinder 12, and is brought into close contact therewith. Since the resin sheet 44 has a closed-cell structure, there is no risk of leakage of water which remains in the inflow cylinder 12 on the primary side, through the resin sheet 44 into the secondary side. The stopper part 44b closely contacts with the inflow cylinder 12, and the circumferential parts 44a, 44c closely contact with the valve seat 20, both expressing the cut-off performance. For this reason, the check valve 400 is improved in the water-tightness in the closed state, as compared with the case where only the valve seat 20 is sealed.

Note that the present invention is not limited to the embodiments described above, and may be modified in various ways. For example, the circumferential part 44a of the resin sheet 44 may be formed thicker that the circumferential part 44c, and the angle of inclination θ1 is set smaller than the angle of inclination θ2 (see FIG. 14). With this configuration, the resin sheet 44 is brought into good contact with the valve seat 20 to improve the water cut-off performance of the check valve 400, even if the guide shaft 32 (see FIG. 13) is decentered from the center of the valve disc 30 and positioned closer to the circumferential part 44c.

The embodiment encompasses the technical ideas described below:

(1) A lift-type check valve which includes a valve seat, and a valve disc which closes the valve seat in an openable/closable manner by linear reciprocating oscillation in the direction approaching or departing away from the valve seat, being configured to allow therein the inflow direction of a fluid flowing into the valve seat and the passing direction of the fluid passing through the valve disc to cross each other, the valve disc being provided with, on the inflow side thereof, a deflection surface on which the fluid is deflected from the inflow direction to the passing direction.

(2) The check valve of (1), wherein the deflection surface is a curved surface which bulges in the direction the valve disc lifts up from the valve seat.

(3) The check valve of (2), wherein the deflection surface and the valve disc are molded from a single material in an integrated manner.

(4) The check valve of (2) or (3), wherein the deflection surface is a partial cylindrical surface formed around a cylinder axis which lies in a direction intersecting both of the inflow direction and the passing direction.

(5) The check valve of (4), wherein the radius of curvature of the partial cylindrical surface is larger than the diameter of a flow path through which the fluid flows into the valve seat.

(6) The check valve of any one of (1) to (5), which further includes a body which houses the valve seat and the valve disc, the body has an inflow cylinder which configures a flow path on the primary side of the valve disc, and an outflow cylinder which configures a flow path on the secondary side of the valve disc, and the end face of the inflow cylinder in the body inclines corresponding to the deflection surface, to configure the valve seat.

(7) The check valve of (6), configured as an angle valve having therein the inflow cylinder and the outflow cylinder arranged so as to intersect the axial directions each other.

(8) The check valve of (6) or (7), further comprising an elastic component which energizes the valve disc towards the valve seat, and a cap part which is detachable from the body, and supports the valve disc and the elastic component, configured so that the valve disc and the elastic component are detachable from the body, by removing the cap part from the body.

(9) A pumping system having the check valve described in any one of (1) to (8), the pumping system which includes:
a liquid reservoir which reserves a fluid;
a pump which is installed overground and pumps up the fluid;
a suction pipe which connects the liquid reservoir and the pump; and
a discharge pipe which allows the fluid discharged from the pump to flow therethrough,
the check valve being provided to the overground part of the suction pipe.

(10) The pumping system of (9),
wherein the suction pipe includes a suction part which is installed upright with the bottom end immersed in the liquid reservoir, and a transfer part which is laid on its side overground and is connected to the pump,
the check valve being provided between the suction part and the transfer part.

The embodiment further encompasses the technical ideas described below:

(i) The check valve described above, wherein the deflection surface is a flat inclined surface, and the direction of normal line on the deflection surface intersects at an angle smaller than 45° with the inflow direction.

(ii) The check valve described above, which further includes a water-tight, sheet-form sealing component which is held between the valve seat and the valve disc.

(iii) The check vale described above, wherein the sealing component has a circumferential part which is held between the valve seat and the valve disc, and a stopper part which is provided inside the circumferential part so as to be contiguous therewith and increased in the thickness, to thereby configure the deflection surface, and the circumferential part and the stopper part are molded from a single material in an integrated manner.

(iv) The check valve described above, wherein the stopper part has a form of oblique cylinder which rises up from the circumferential part towards the oscillating direction of the valve disc, so as to allow, when the valve disc is closed, the sealing component to come into contact with the valve seat in a three-dimensional manner.

(v) The check valve described above, wherein the sealing component configures the deflection surface, and is formed using a closed-cell foam resin material.

(vi) The check valve described above, wherein the valve disc and the cap part are rotatable to each other, and the elastic component is pressurized against at least one of the valve disc and the cap part in a non-fixed manner.

(vii) The check valve described above, wherein at least one of the valve disc and the cap part is provided with a resin material which frictionally holds the end of the elastic component.

(viii) The check valve described above, which further includes a guiding part which guides the valve disc to slide over the cap part in an non-rotatable manner.

(ix) The pumping system described above, wherein the check valve includes a body which houses the valve seat and the valve disc, and a pressure reducing port which is formed to be opened in the body on the primary side of the valve disc, the pumping system further includes a vacuum pump connected to the pressure reducing port, and the pump being an inverter pump.

This application claims the priority of Japanese patent application No. 2012-124090 filed on May 31, 2012, and Japanese patent application No. 2013-12498 filed on Jan. 25, 2013, the contents of which are incorporated hereinto by reference.

The invention claimed is:

1. A lift-type check valve having a first opening and a second opening, a fluid passing throughout the lift-type check valve from the first opening to the second opening, the lift-type check valve comprising:

an inflow cylinder having the first opening at a first end surface thereof and a second end surface opposite to the first end surface, the first end surface attached directly to a flange part, the second end surface being a single plane serving as a valve seat, wherein the inflow cylinder has an inflow direction;

a valve cylinder provided at a downstream side of the inflow cylinder along the inflow direction;

an outflow cylinder connected to the valve cylinder, the outflow cylinder having the second opening and a passing direction, wherein the inflow direction intersects with the passing direction;

a valve disc provided in the valve cylinder to operate in an openable manner and a closable manner by linear reciprocating oscillation in the inflow direction by approaching to or departing away from the valve seat; and a deflection surface provided on the valve disc on which the fluid is deflected from the inflow direction to the passing direction when the valve disc is opened, wherein the deflection surface is a flat inclined surface in which a normal line extended from the flat deflection surface toward an upstream side intersects with the inflow direction at an angle smaller than 45.

2. The check valve of claim 1, wherein the normal line intersects with the inflow direction at an angle between 15° and 22.5°.

3. The check valve of claim 1, further comprising a water-tight, sheet-form sealing component which is held between the valve seat and the valve disc.

4. The check valve of claim 3, wherein the sealing component has a circumferential part which is held between the valve seat and the valve disc, and a stopper part which is provided inside the circumferential part so as to be contiguous therewith and increased in the thickness, to thereby configure the deflection surface, and the circumferential part and the stopper part are molded from a single material in an integrated manner.

5. The check valve of claim 4, wherein the stopper part has a form of oblique cylinder which rises up from the circumferential part towards an oscillating direction of the valve disc, so as to allow, when the valve disc is closed, the sealing component to come into contact with the valve seat in a three-dimensional manner.

6. The check valve of claim 3, wherein the sealing component configures the deflection surface, and is formed using a closed-cell foam resin material.

7. The check valve of claim 1, wherein the deflection surface and the valve disc are molded from a single material in an integrated manner.

8. The check valve of claim 1, wherein the second end surface of the inflow cylinder inclines corresponding to the deflection surface, to configure the valve seat.

9. The check valve of claim 8, wherein the inflow direction intersects with the passing direction at a right angle.

10. The check valve of claim 8, further comprising an elastic component which energizes the valve disc towards the valve seat, and a cap part which is detachable from the valve cylinder, and supports the valve disc and the elastic component, configured so that the valve disc and the elastic component are detachable from the valve cylinder, by removing the cap part from the valve cylinder.

11. The check valve of claim 10, wherein the valve disc and the cap part are rotatable to each other, and the elastic component is pressurized against at least one of the valve disc and the cap part in a non-fixed manner.

12. The check valve of claim 11, wherein at least one of the valve disc and the cap part is provided with a resin material which frictionally holds an end of the elastic component.

13. The check valve of claim 10, further comprising a guiding part which guides the valve disc to slide over the cap part in an unrotatable manner.

14. A pumping system having the check valve described in claim 1, the pumping system comprising:
 a liquid reservoir which reserves a liquid;
 a pump which is installed overground and pumps up the liquid;
 a suction pipe which connects the liquid reservoir and the pump; and
 a discharge pipe which allows the liquid discharged from the pump to flow therethrough, the check valve being provided to the overground part of the suction pipe.

15. The pumping system of claim 14,
 wherein the suction pipe comprises a suction part which is installed upright with the bottom end immersed in the liquid reservoir, and a transfer part which is laid on its side overground and is connected to the pump,
 the check valve being provided between the suction part and the transfer part.

16. The pumping system of claim 14,
 wherein the check valve comprises a pressure reducing port which is formed to be opened in the inflow cylinder,
 the pumping system further comprising a vacuum pump connected to the pressure reducing port, and the pump being an inverter pump.

* * * * *